US011990056B2

(12) United States Patent
Scheid et al.

(10) Patent No.: US 11,990,056 B2
(45) Date of Patent: May 21, 2024

(54) DATA SYSTEM CONTENT DEVELOPMENT, MAINTENANCE, MIGRATION, INTEGRATION, AND ARCHIVING

(71) Applicant: K16 Solutions Inc., Scottsdale, AZ (US)

(72) Inventors: Jordan Philip Scheid, Chesapeake, VA (US); Peter Leroy Diltz, Falls City, NE (US); Vincent Anthony Smeraldo, Oak Lawn, IL (US)

(73) Assignee: K16 Solutions Inc., Scottsdale, AZ (US)

( * ) Notice: Subject to any disclaimer, the term of this patent is extended or adjusted under 35 U.S.C. 154(b) by 0 days.

(21) Appl. No.: 17/516,559

(22) Filed: Nov. 1, 2021

(65) Prior Publication Data

US 2023/0137397 A1 May 4, 2023

(51) Int. Cl.
*G09B 5/02* (2006.01)
*G06F 9/54* (2006.01)
*G06F 16/11* (2019.01)
*G09B 5/06* (2006.01)
*G09B 7/00* (2006.01)

(52) U.S. Cl.
CPC .............. *G09B 5/02* (2013.01); *G06F 9/541* (2013.01); *G06F 16/113* (2019.01); *G09B 5/06* (2013.01); *G09B 7/00* (2013.01)

(58) Field of Classification Search
CPC .... G09B 5/02; G09B 7/00; G09B 5/06; G06F 16/113; G06F 9/541
See application file for complete search history.

(56) References Cited

U.S. PATENT DOCUMENTS

| | | | |
|---|---|---|---|
| 9,176,938 B1* | 11/2015 | Kerschen | G06F 16/93 |
| 2013/0144605 A1* | 6/2013 | Brager | G06F 16/30 |
| | | | 704/9 |
| 2014/0120516 A1* | 5/2014 | Chiang | G09B 5/02 |
| | | | 434/362 |
| 2014/0220540 A1* | 8/2014 | Burgin | G09B 7/07 |
| | | | 434/362 |
| 2014/0335497 A1* | 11/2014 | Gal | G09B 7/00 |
| | | | 434/323 |
| 2016/0063872 A1* | 3/2016 | Trujillo | G06F 16/44 |
| | | | 707/722 |
| 2018/0096613 A1* | 4/2018 | Torman | G09B 5/02 |

(Continued)

*Primary Examiner* — Jack Yip

(57) ABSTRACT

A method for migrating course content may include extracting, from a source system, a first portion of a course data at the source system via an application programming interface (API) associated with the source system such as a public application programming interface and/or a private application programming interface. A second portion of the course data may be extracted from the source system by screen scraping. The course data may be transformed and at least a portion of the transformed course data is transferred to the target system while student data associated with the course data is archived. The source system and the target system may be a same or different one of a learning management system, a student information system, a customer relationship management system, an enterprise resource planning system, a financial aid management system, and a human resource management system. Related systems and computer program products are also provided.

14 Claims, 28 Drawing Sheets

(56) References Cited

U.S. PATENT DOCUMENTS

2019/0116093 A1\* 4/2019 Capps ................... H04L 41/22
2020/0265195 A1\* 8/2020 Galitsky ................ G06F 40/35
2020/0357296 A1\* 11/2020 Sharma .............. G06Q 50/2057

\* cited by examiner

Model Key allow_liking assignment_group development_status discussion_type due_at editor1 — Value Taken From Public API editor2 forum_id graded points position post_text — Value Taken From Screen Scraping publish thread_message thread_subject title — Value Taken From Private API

Options

Value Landed via Screen Scrape
☑ Allow threaded replies
☑ Users must post before seeing replies
☐ Enable podcast feed
☐ Graded
☐ Allow liking
☐ Add to student to-do

FIG. 10C

DATA SYSTEM CONTENT DEVELOPMENT, MAINTENANCE, MIGRATION, INTEGRATION, AND ARCHIVING

TECHNICAL FIELD

The subject matter described herein relates generally to data management systems and more specifically to content development, maintenance, migration, integration, and archiving for data management systems.

BACKGROUND

A learning management system (LMS) is a software application providing a variety functionalities such as the administration, documentation, tracking, reporting, automation, and delivery of educational content. A typical learning management system may manage and deliver educational content in a variety of formats including, for example, text, images, videos, links, and/or the like. In addition to enhanced tracking, analysis, and reporting of student progress, learning management systems also provide integral support for distance learning. For example, many learning management systems provide a virtual learning environment (VLE) in which various educational resources and activities are made available in a digital format and accessible from remote locations.

SUMMARY

Systems, methods, and articles of manufacture, including computer program items, are provided for the development, maintenance, migration, integration, and archiving of course content or course data for data systems. In one aspect, there is provided a system. The system may include at least one data processor and at least one memory. The at least one memory may store instructions that cause operations when executed by the at least one data processor. The operations may include: extracting, from a source system, a first portion of a course data at the source system via an application programming interface (API) associated with the source system; performing a screen scraping to extract, from the source system, a second portion of the course data; transforming the course data extracted from the source system; and transferring, to the target system, at least a portion of the transformed course data.

In some variations, one or more features disclosed herein including the following features can optionally be included in any feasible combination. The first portion of the course data may be extracted via a public application programming interface (API) associated with the source system. A third portion of the course data that is inaccessible through the public application programing interface may be extracted via a private application programming interface associated with the source system.

In some variations, the screen scraping may be performed to extract the second portion of the course data in response to the second portion of the course data being inaccessible via the public application programming interface and the private application programming interface.

In some variations, the screen scraping may be performed on at least the second portion of the course data displayed in a graphical user interface (GUI) and/or one or more webpages associated with the source system.

In some variations, the course data may include one or more course components for each of a plurality of courses. Each course component may include one or more fields corresponding to one or more key-value pairs. Each key-value pair may include a value corresponding to one or more user inputs and/or user settings.

In some variations, the operations may further include: maintaining, for each field included in a course component, a mapping between a corresponding key at each of a plurality of systems.

In some variations, the transforming of the course data may include determining, based on a mapping between a first key associated with the source system and a second key associated with the target system, that a first field included in the course data corresponds to a second field at the target system, and populating, based at least on the correspondence between the first field and the second field, the second field with one or more values associated with the first field.

In some variations, the transforming may include adding, removing, and/or modifying one or more fields included in the course data.

In some variations, the one or more course components may include a syllabus, an assignment, a quiz, a discussion, a reading, a question, and a test.

In some variations, the operations may further include: archiving, in a data store, at least a portion of the course data.

In some variations, the operations may further include: archiving, at a data store, at least a portion of historical student data associated with the course data; integrating the archived historical student data with the course data in the data store such that the historical student data is accessible outside of the source system and the target system; and integrating the archived student data with the transformed course data transferred to the target system such that the archived student data is accessible through the target system.

In some variations, the transferring of the course data may include pushing the course data to the target system.

In some variations, the source system and the target system may be a same or a different one of a learning management system (LMS), a student information system (SIS), a customer relationship management system (CRM), an enterprise resource planning (ERP) system, a financial aid management system, and a human resource management (HRM) system.

In some variations, the extracting of the first portion of course data and/or the extracting of the second portion of course data may be performed by a listener. The listener may be further configured to detect a change in one or more user specified data elements at the source system by at least performing a delta check between a data element pulled from the source system and a previous version of the data element.

In some variations, the data element may be transferred to the target system in response to the listener detecting a change between the data element pulled from the source system and the previous version of the data element.

In some variations, the listener may include a first cron job configured to execute in accordance with a first user specified schedule to pull data from the source system.

In some variations, the first cron job may be further configured to push data to the target system in accordance with the first user specified schedule.

In some variations, the listener may further include a second cron job configured to execute in accordance with a second user specified schedule to push data to the target system.

In another aspect, there is provided a method for the development, maintenance, migration, integration, and archiving of course content for data systems. The method may include: extracting, from a source system, a first portion of a course data at the source system via an application programming interface (API) associated with the source system; performing a screen scraping to extract, from the source system, a second portion of the course data; transforming the course data extracted from the source system; and transferring, to the target system, at least a portion of the transformed course data.

In another aspect, there is provided a computer program product including a non-transitory computer readable medium storing instructions. When executed by at least one data processor, the instructions may cause operations that include: extracting, from a source system, a first portion of a course data at the source system via an application programming interface (API) associated with the source system; performing a screen scraping to extract, from the source system, a second portion of the course data; transforming the course data extracted from the source system; and transferring, to the target system, at least a portion of the transformed course data.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to the development, maintenance, migration, integration, and archiving of course content for learning management systems, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 7A depicts an example of a data model key from a data controller that shows course data components being ingested from a source system, in accordance with some example embodiments;

FIG. 8C depicts another example of a mapping between course data components across multiple learning management systems within a data controller, in accordance with some example embodiments;

FIG. 10C depicts a screenshot illustrating an example of course data that has been migrated from a data controller to a target system via screen scraping, in accordance with some example embodiments;

When practical, similar reference numbers denote similar structures, features, or elements.

DETAILED DESCRIPTION

Figure 1:
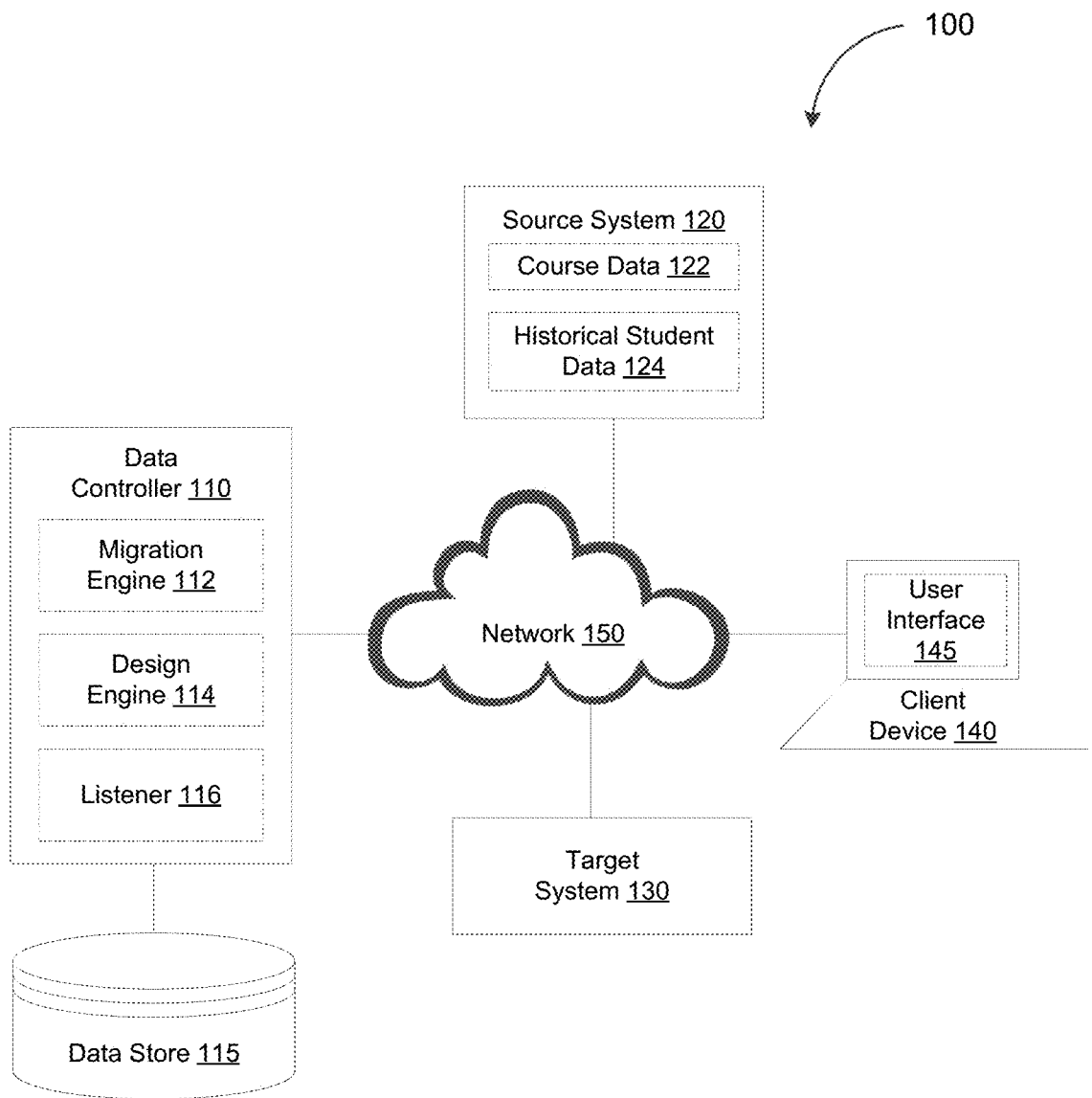
FIG. 1 depicts a system diagram illustrating an example of a course content development, migration, and archiving system, in accordance with some example embodiments.

A learning management system (LSM) may provide remote access to a variety of educational resources and activities including, for example, videos, courses, documents, links, and/or the like. The learning management system may be hosted on-premise or in a cloud environment. In the latter deployment scenario, course data within the learning management system is typically maintained by the vendor on shared computing resources while various functionalities of the learning management system are made available to users through the Internet and in accordance with a software-as-a-service (SaaS) delivery model. A cloud-based learning management system maintained by the vendor may require less technical expertise but tends to be less accessible when implementing customer-specific customizations. Nevertheless, whether hosted on-premise or in the cloud, migrating course content from a source system to a target system, whether as a part of an upgrade from a legacy system or a transition to a different learning management system product altogether, may require significant investments in time and resources due to various incompatibilities between different learning management systems.

As such, in some example embodiments, a data controller may be configured to perform course content or course data migration between a source system and a target system with one or more differences in course structure. As used herein, the term "course content," which may be used interchangeably with the term "course data," may refer to a variety of course components including, for example, syllabus, assignments, readings, quizzes, discussion questions, tests, and/or the like. The data controller may identify corresponding course components and reconcile incompatibilities that may exist between corresponding course components at the source system and the target system. Although the same course components are often present at the source system and the target system, differences in course structure can cause the mislabeling and/or loss of at least some of the course data during migration. Thus, by identifying corresponding course components and reconciling any incompatibilities, the data controller may migrate course content from the source system to the target system with minimal reconstruction and user intervention. Furthermore, the data controller may be configured to perform a completeness check to identify any course components that may be missing subsequent to the migration from the source system to the target system.

In some example embodiments, the data controller may be configured to provide a cloud-based archive for course level data and corresponding historical student data. For example, in addition to course components such as assignments, readings, quizzes, discussion questions, and tests, the source system may also maintain other course level data such as the student grades associated with individual assignments, quizzes, and tests. Instead of historical student data being migrated to the target system, historical student data from the source system may be archived in order to preserve access for record-keeping purposes and/or to comply with certain regulations, after use of the source system is terminated. This is because unlike course level data that is not user-specific and timestamped automatically to reflect when the data is uploaded, historical student data record is user-specific and time-specific. Historical student data is therefore maintained outside of the learning management system and apart from the course level data. Thus, while course level data may be migrated to the target system, the corresponding historical student data may be not transferred to the target system. Instead, the data controller may archive the historical student data, which may be integrated with the course level data migrated to the target system to preserve continued access to the historical student data from the target system.

In some example embodiments, the data controller may be configured to provide a user interface for developing new course content and updating existing course content. For example, the data controller may provide a selection of templates for creating a syllabus that includes modifiable areas and non-modifiable areas that vary based on the role of the user creating the syllabus. Moreover, the data controller may support a drag-drop functionality for adding content such as text, images, and videos. Upon completion, the course content may be published directly to a target system. In the event the same course content is associated with multiple learning management systems, the updates may be propagated to each target system.

FIG. 1 depicts a system diagram illustrating a content development, maintenance, migration and archiving system 100, in accordance with some example embodiments. Referring to FIG. 1, the content development, maintenance, migration and archiving system 100 may include a data controller 110, a source system 120, a target system 130, and a client device 140. As shown in FIG. 1, the data controller 110, the source system 120, the target system 130, and the client device 140 may be communicatively coupled via a network 150. The client device 140 may be a processor-based device including, for example, a cellular phone, a smartphone, a tablet computer, a laptop computer, a desktop, a workstation, and/or the like. The network 150 may be a wired network and/or a wireless network including, for example, a public land mobile network (PLMN), a local area network (LAN), a wide area network (WAN), a virtual local area network (VLAN), the Internet, and/or the like.

Referring again to FIG. 1, the data controller 110 may include a migration engine 112, which may be configured to migrate the course data 122 from the source system 120 to the target system 130. The migration may be performed as a part of an upgrade from a legacy system or a transition to a different learning management system product. The course data 122 may include, for each course, various course components such as, for example, syllabus, assignments, readings, quizzes, discussion questions, tests, and/or the like. Moreover, the course data 122 may include course components in a variety of format including, for example, text, images, videos, links, and/or the like.

The source system 120 and the target system 130 may be a same type or different types of data management system including, for example, a learning management system (LMS), a student information system (SIS), a customer relationship management system (CRM), an enterprise resource planning (ERP) system, a human resource management (HRM) system, a financial aid management system, and/or the like. In the example shown in FIG. 1, the source system 120 and the target system 130 are depicted as different learning management systems (LMS) but it should be appreciated that the source system 120 and the target system 130 may be any type of data management system.

Although the source system 120 and the target system 130 may be different learning management systems that share at least some common course components, differences in course structure can cause the mislabeling and/or loss of at least some course components during migration. For example, the source system 120 may store the course data 122 in accordance to a complex data model with a different set of fields than the data model at the target system 130. Even when a course component at the source system 120 includes the same set of fields as the same course component at the target system 130, one or more of the fields may be assigned a different labels. To ensure completeness of the course data 122 migrated to the target system 130, the migration engine 112 may be configured to identify corresponding course components, including corresponding fields, and reconcile incompatibilities that may exist between corresponding course components at the source system 120 and the target system 130. For instance, the migration engine 112 may apply a library of transformations when migrating a course component from the source system 120 that does not map directly to a course component at the target system 130. Moreover, the migration engine 112 may extract the course data 122 from the source system 120 through a variety of channels including, for example, a public application programming interface (API), a private application programming interface (API), and screen scraping.

As noted, the migration engine 112 may extract the course data 122 from the source system 120 through a variety of channels including, for example, a public application programming interface (API), a private application programming interface (API), and screen scraping. For example, the migration engine 112 may extract a first portion of the course data 122 through a first channel such as a public application programming interface (API) associated with the source system 120. In some example embodiments, the migration engine 112 may extract the course data 122 through additional channels to ensure that a second portion of the course data 122 that is inaccessible through the first channel (e.g., the public application programming interface (API)) is extracted through a second channel such as a private application programming interface (API) associated with the source system 120. Moreover, in some cases, the migration engine 112 may use a third channel, such as screen scraping, to extract a third portion of the course data 122 that is inaccessible through the first channel and the second channel.

As used herein, a public application programming interface (API) or an open application programming interface (API) may be exposed to any user to provide access to at least a portion of the data and application functionalities associated with the source system 120. Although a private application programming interface (API) also provides access to at least a portion of the data and application functionalities associated with the source system 120, a private application programing interface (API) is exposed to users with adequate permissions. With extractions performed via either the public application programming interface or the private application programming interface, the course data 122 may be transferred from the source system 120 to the migration engine 112 in one or more data structures suitable for immediate parsing by the migration engine 112. In the case of screen scraping, the migration engine 112 may extract the course data 122 by extracting the human-readable output displayed, for example, in a webpage (e.g., displayed by a web browser) or a graphical user interface (GUI) associated with the source system 120. The course data 122 that is extracted via screen scraping may undergo at least some preprocessing, such as image recognition, text recognition, and/or the like, before being parsed by the migration engine 112. Examples of image recognition techniques include a variety of machine learning based computer vision algorithms including, for example, neural networks trained to perform tasks such as image classification, object detection, object tracking, semantic segmentation, and instance segmentation. Examples of text recognition techniques include optical character recognition (OCR) algorithms such as matrix matching, feature extraction, and/or the like.

Figure 2A:
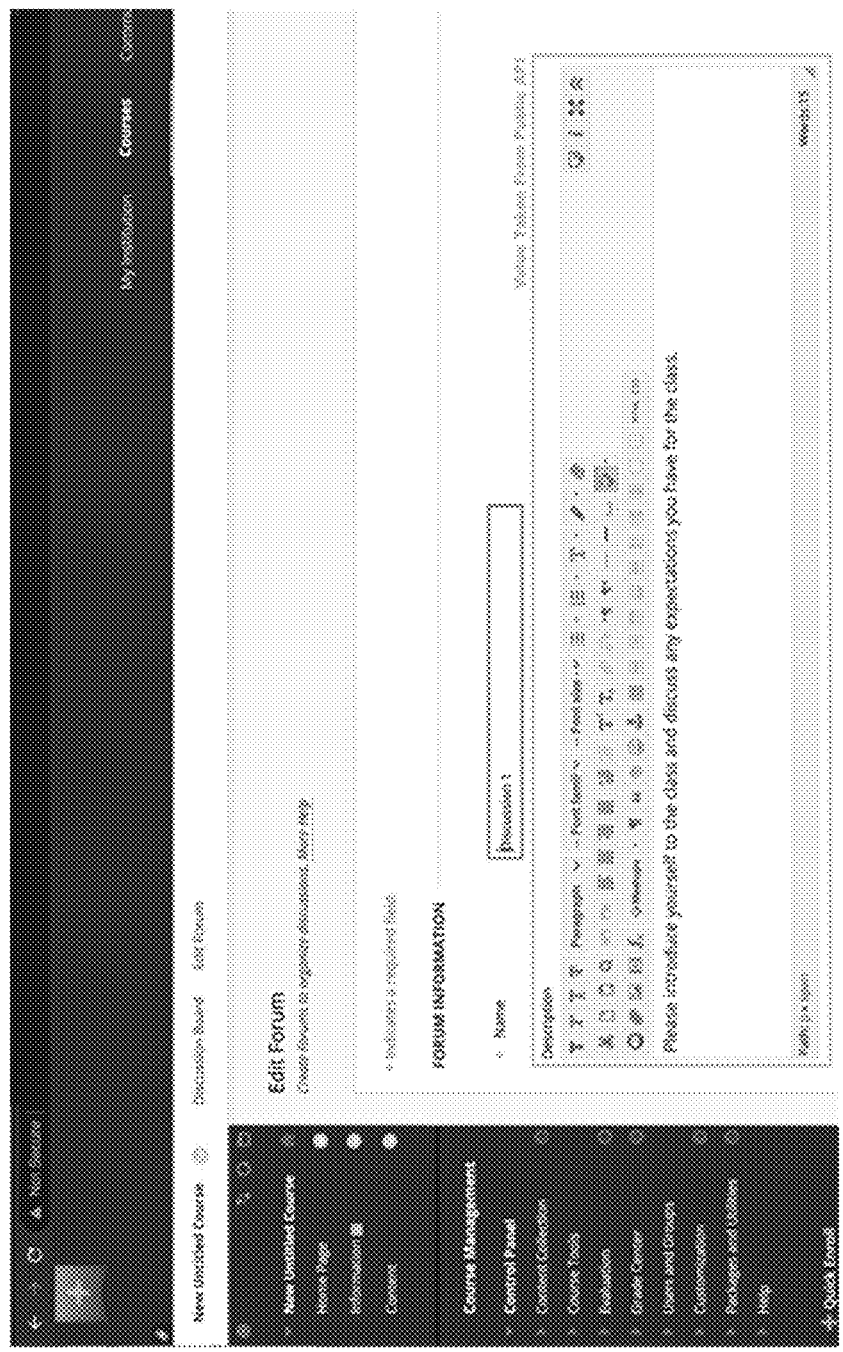
FIG. 2A depicts a screenshot illustrating an example of course data that will be extracted from a source system via a public application programming interface (API), in accordance with some example embodiments.
Figure 2B:
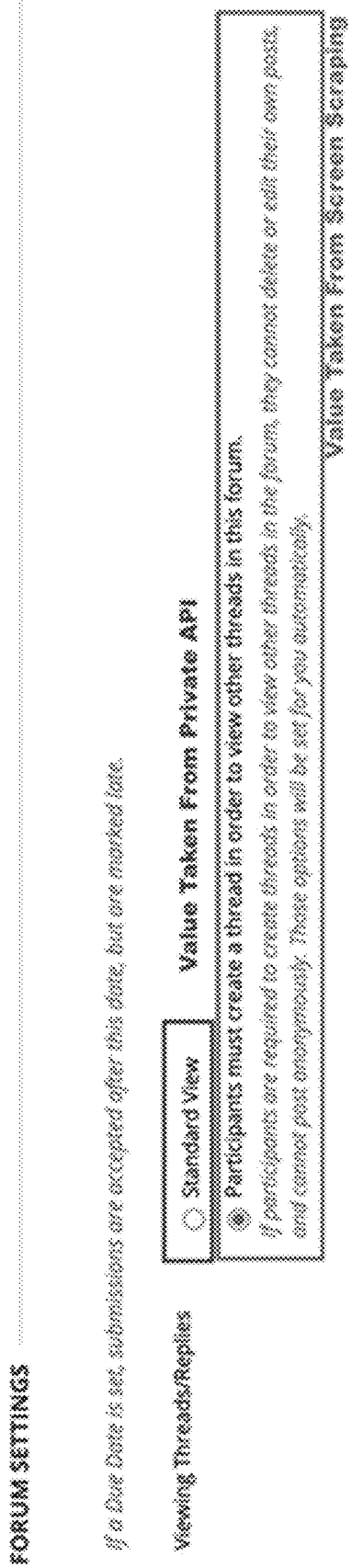
FIG. 2B depicts a screenshot illustrating an example of course data that will be extracted from a source system via a private application programming interface (API) and an example of course data being extracted from the source system via screen scraping, in accordance with some example embodiments.

FIGS. 2A-B depict an example of a course component with fields that require extraction via a public application programming interface (API), a private application programming interface (API), and screen scraping. In the example shown in FIGS. 2A-B, the description of a discussion thread in a forum associated with a course may be extracted via a public application programming interface (API) while a first setting associated with the discussion thread (e.g., "standard view") may be extracted via a private application programming interface (API) and a second setting associated with the discussion thread (e.g., "participant must create a thread in order to view other threads in this forum") may be extracted via screen scraping.

Figure 3A:
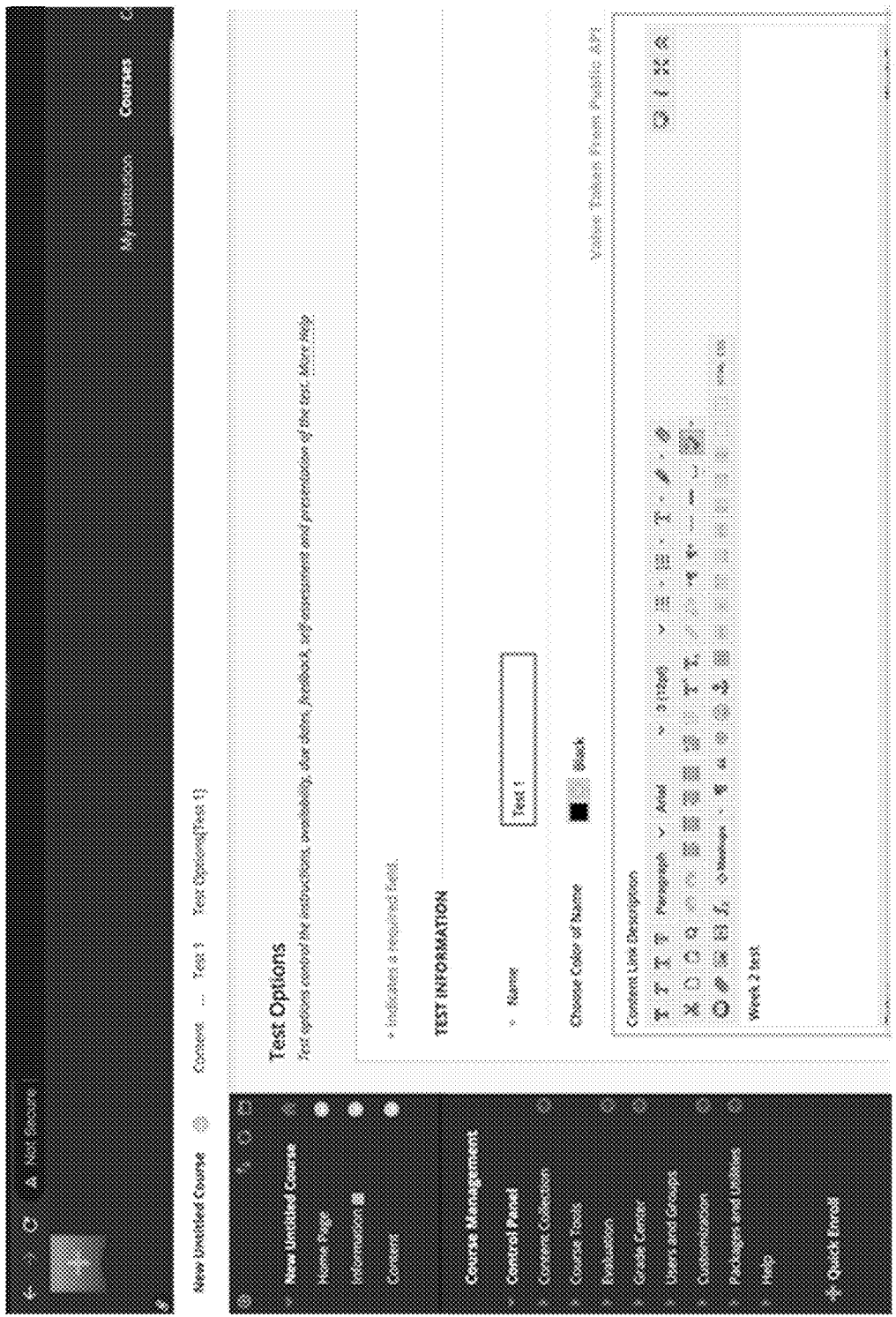
FIG. 3A depicts a screenshot illustrating another example of course data that will be extracted from a source system via a public application programming interface (API), in accordance with some example embodiments.
Figure 3B:
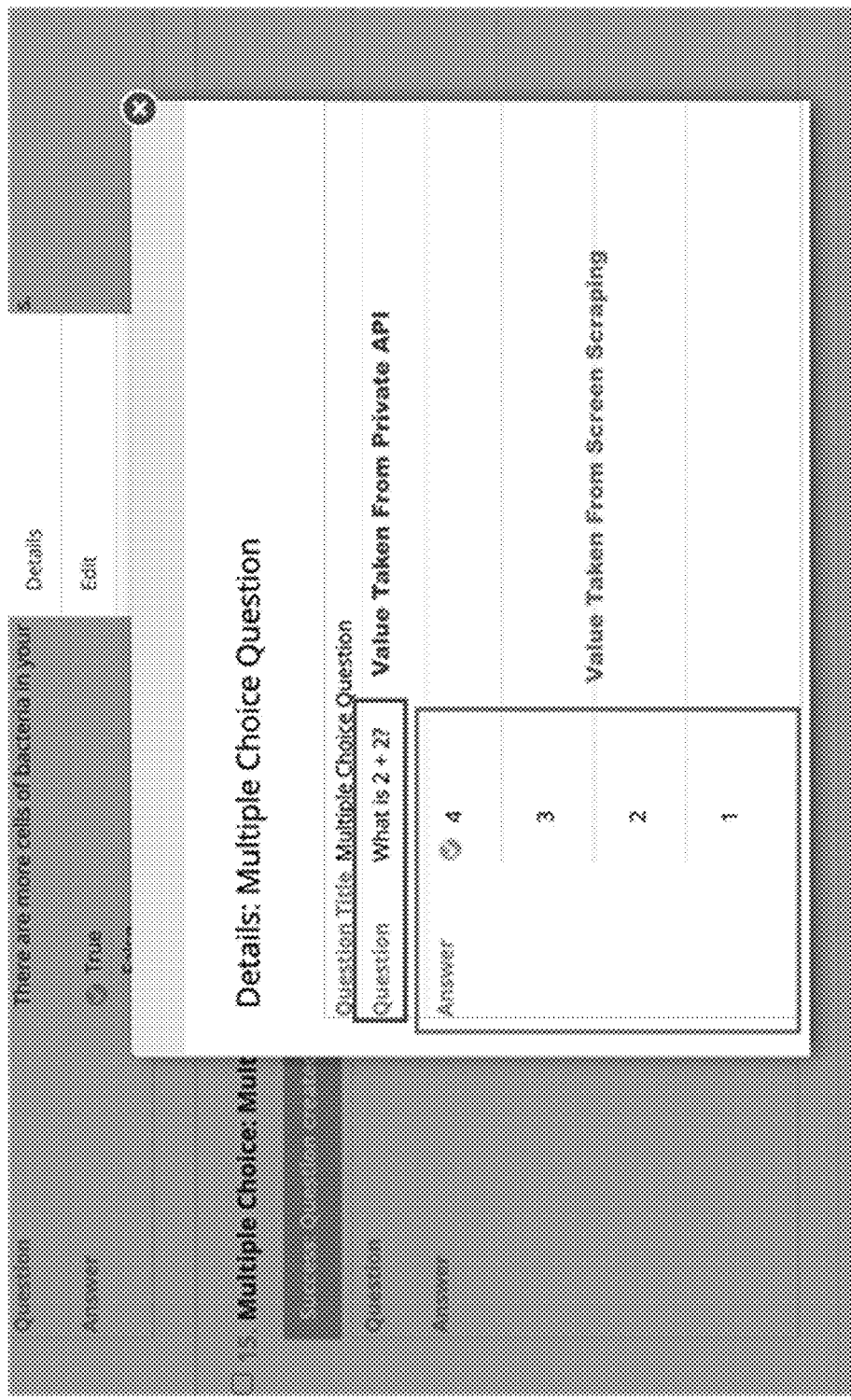
FIG. 3B depicts a screenshot illustrating another example of course data that will be extracted from a source system via a private application programming interface (API) and another example of course data that will be extracted from the source system via screen scraping, in accordance with some example embodiments.
Figure 3C:
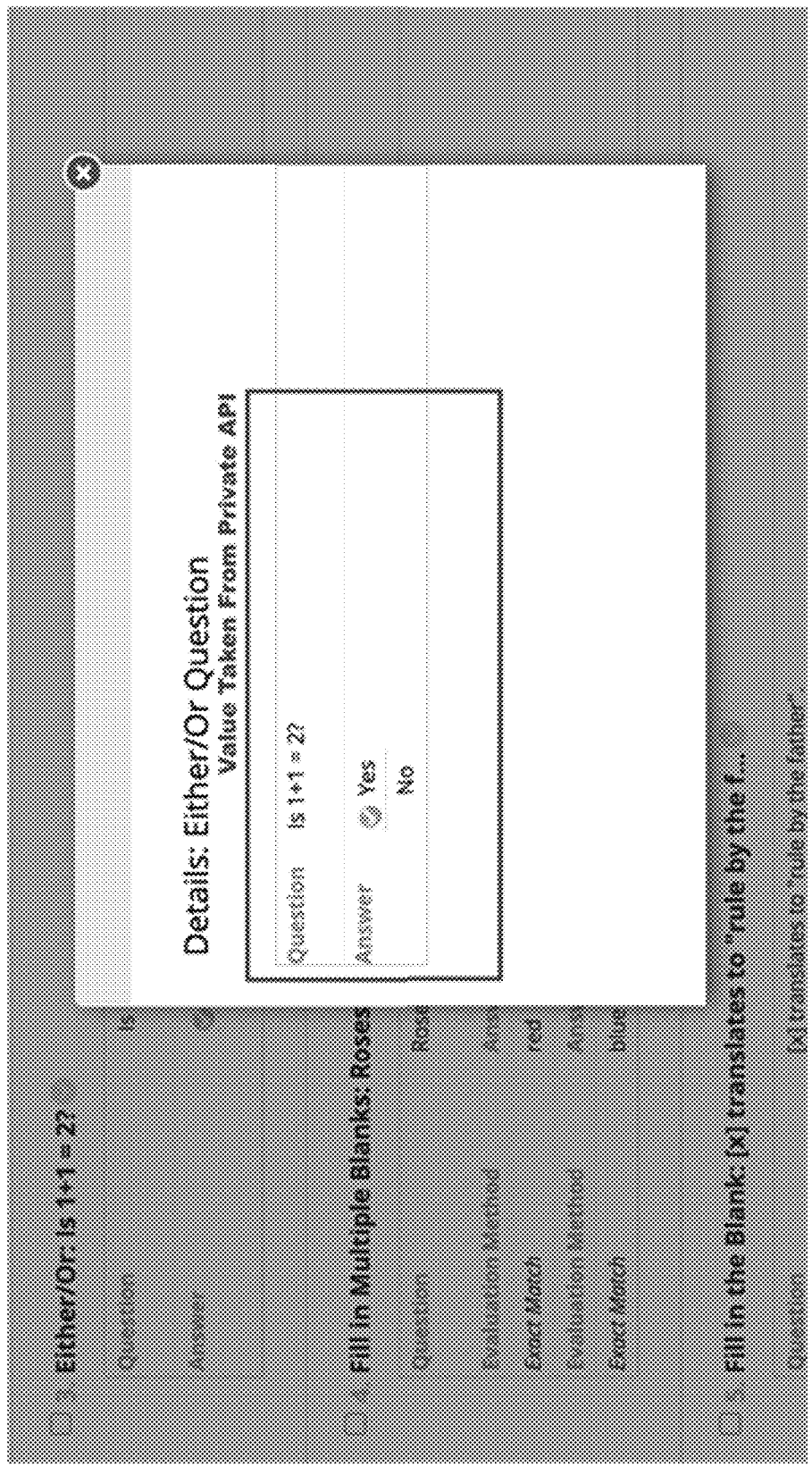
FIG. 3C depicts a screenshot illustrating another example of course data that will be extracted from a source system via a private application programming interface (API), in accordance with some example embodiments.

FIGS. 3A-C depict another example of a course component with fields that require extraction via a public application programming interface (API), a private application programming interface (API), and screen scraping. As shown in FIG. 3A, the description of a test may be extracted via a public application programming interface (API). FIG. 3B shows that the text of a first type of question, such as a multiple choice question, may be extracted via a private application programming interface (API) while the answers associated with the first type of question may be extracted via screen scraping. Meanwhile, FIG. 3C shows that the text and answers associated with a second type of question, such as an either/or question, may be extracted via a private application programming interface (API).

Figure 4A:
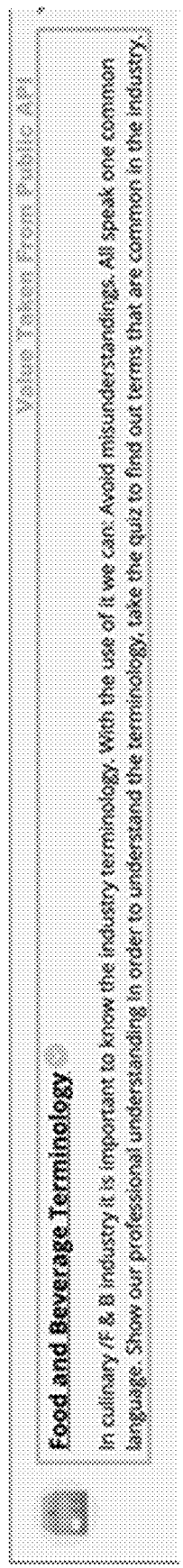
FIG. 4A depicts a screenshot illustrating another example of course data that will be extracted from a source system via a public application programming interface (API), in accordance with some example embodiments.
Figure 4B:
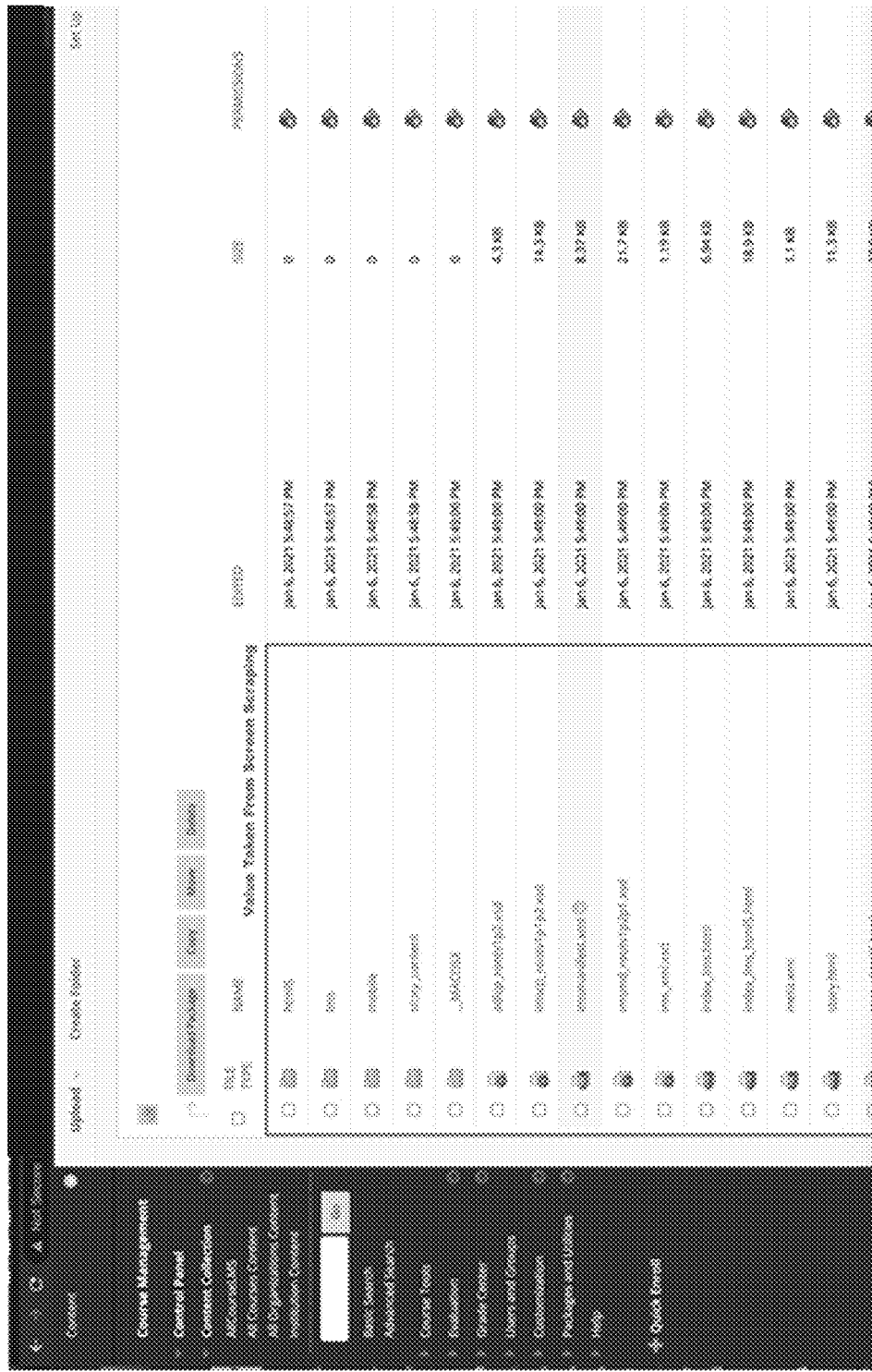
FIG. 4B depicts a screenshot illustrating another example of course data that will be extracted from a source system via screen scraping, in accordance with some example embodiments.
Figure 4C:
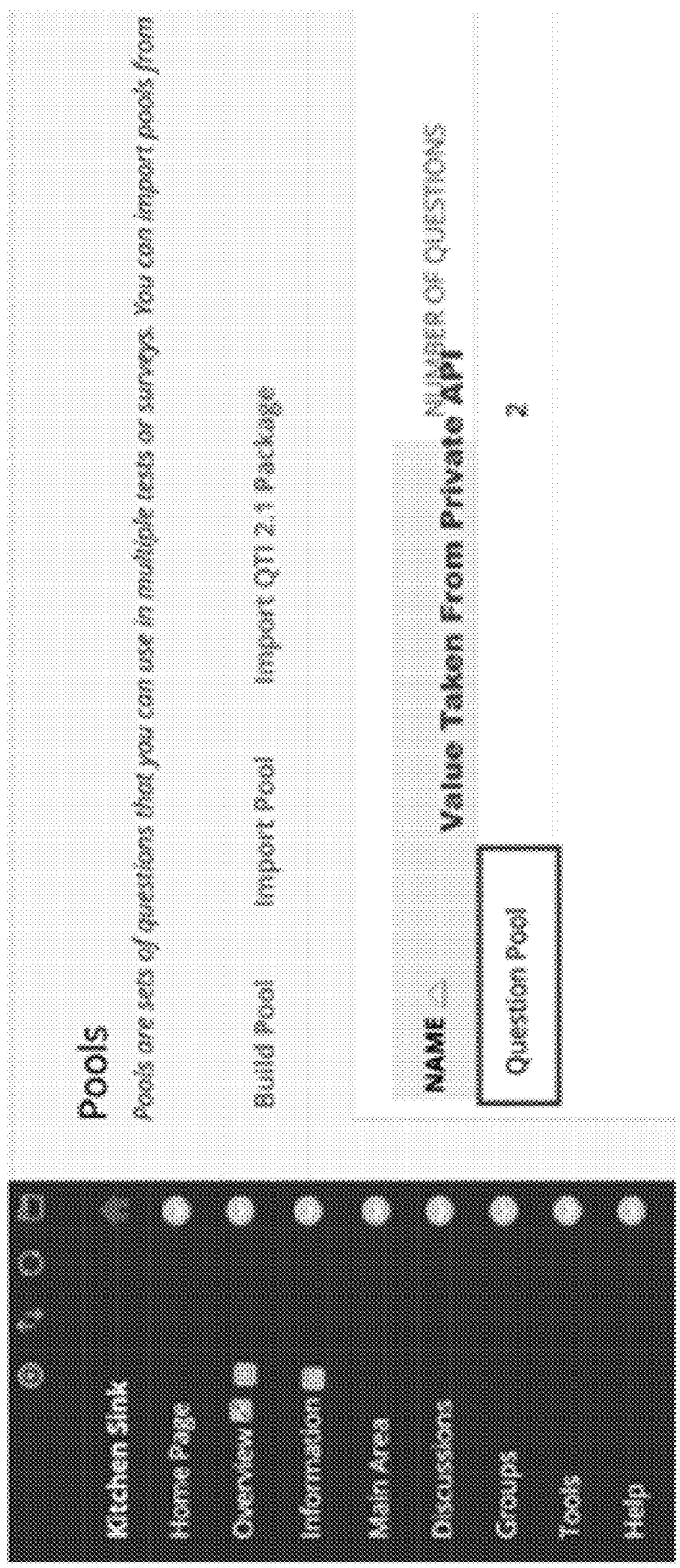
FIG. 4C depicts a screenshot illustrating another example of course data that will be extracted from a source system via a private application programming interface (API), in accordance with some example embodiments.

FIGS. 4A-C depict another example of a course component with fields that require extraction via a public application programming interface (API), private application programming interface (API), and screen scraping. In the case, the source system 120 is compliant with the Sharable Content Object Reference Model (SCORM), FIG. 4A shows that the title and description of a course may be extracted via a public application programming interface (API), while FIG. 4B shows that the file directory for the course may be extracted via screen scraping, and the question pools may be extracted via a private application programming interface (API).

In some example embodiments, the migration engine 112 may migrate the course data 122 from the source system 120 by first pulling the course data 122 to the data controller 110. In some cases, at least a portion of the course data 122 may be archived at the data controller 110, for example, in a data store 115, before being pushed to the target system 130. The data store 115 may be a database including, for example, a relational database, a graph database, an in-memory database, a non-SQL (NoSQL) database, and/or the like.

Figure 5A:
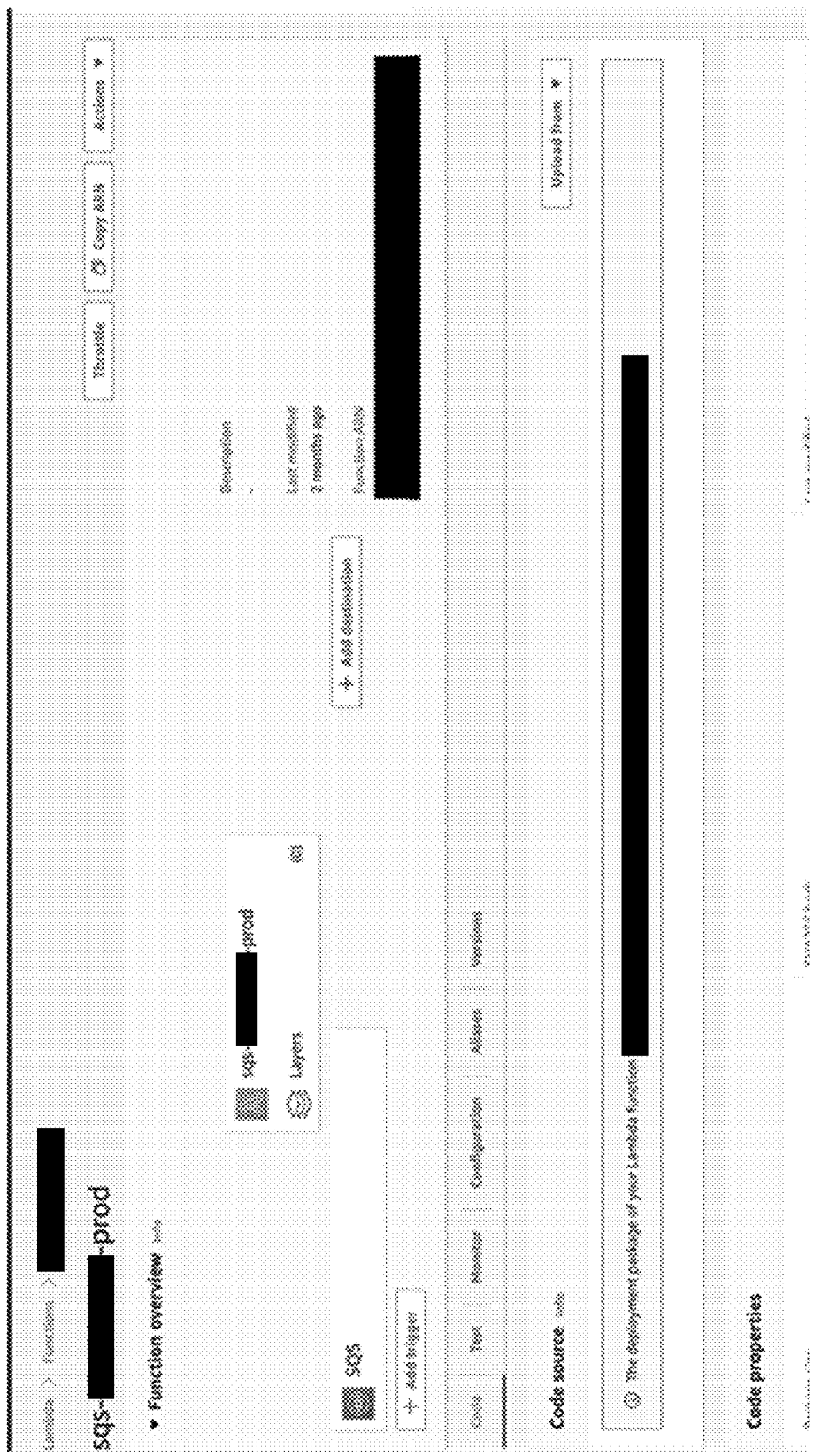
FIG. 5A depicts a screenshot illustrating an example of a user interface to initiate a microservice for migrating course data from a source system to a data controller, in accordance with some example embodiments.
Figure 5B:
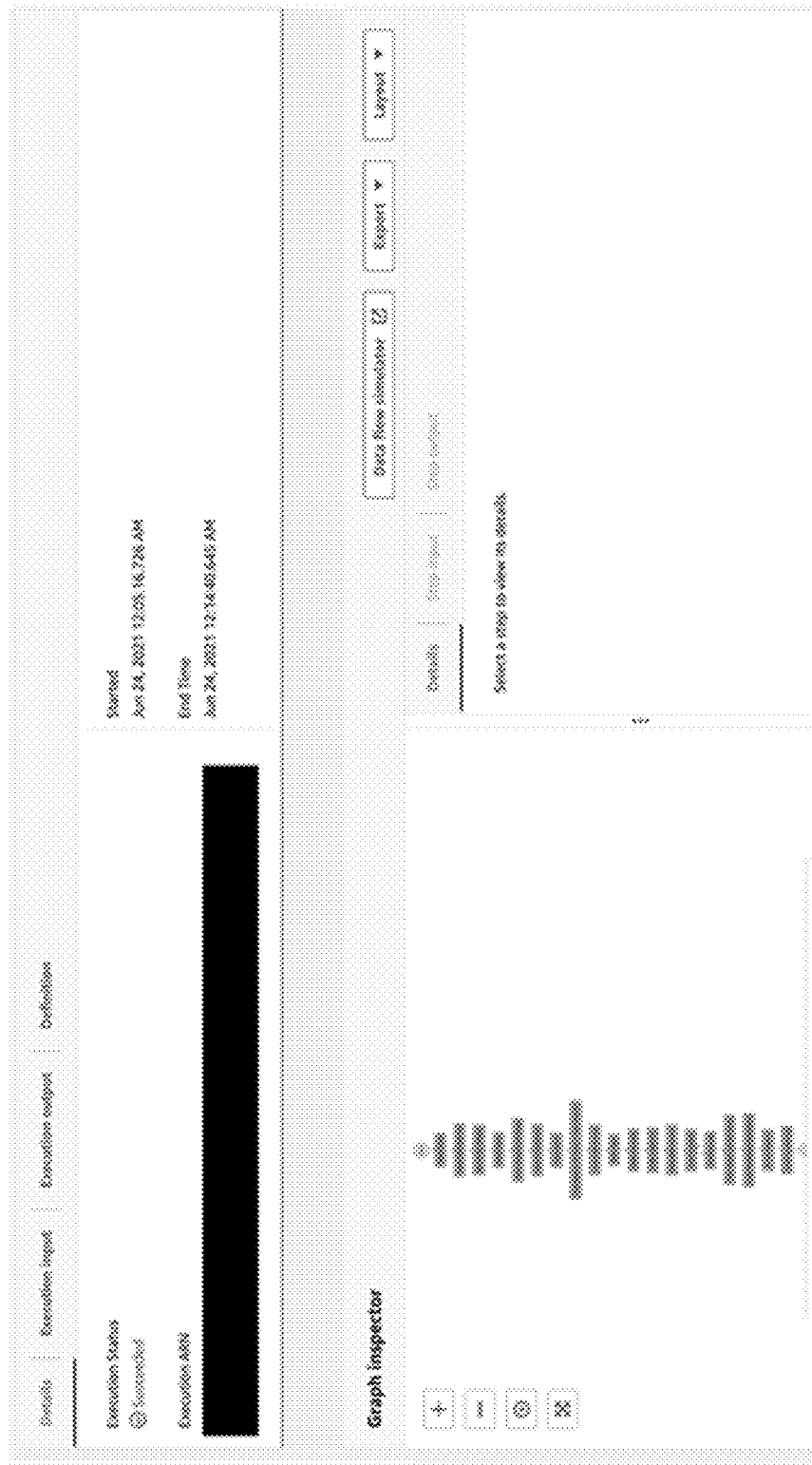
FIG. 5B depicts a screenshot illustrating an example of a data controller initiating a microservice to migrate course data from a source system to the data controller, in accordance with some example embodiments.
Figure 6A:
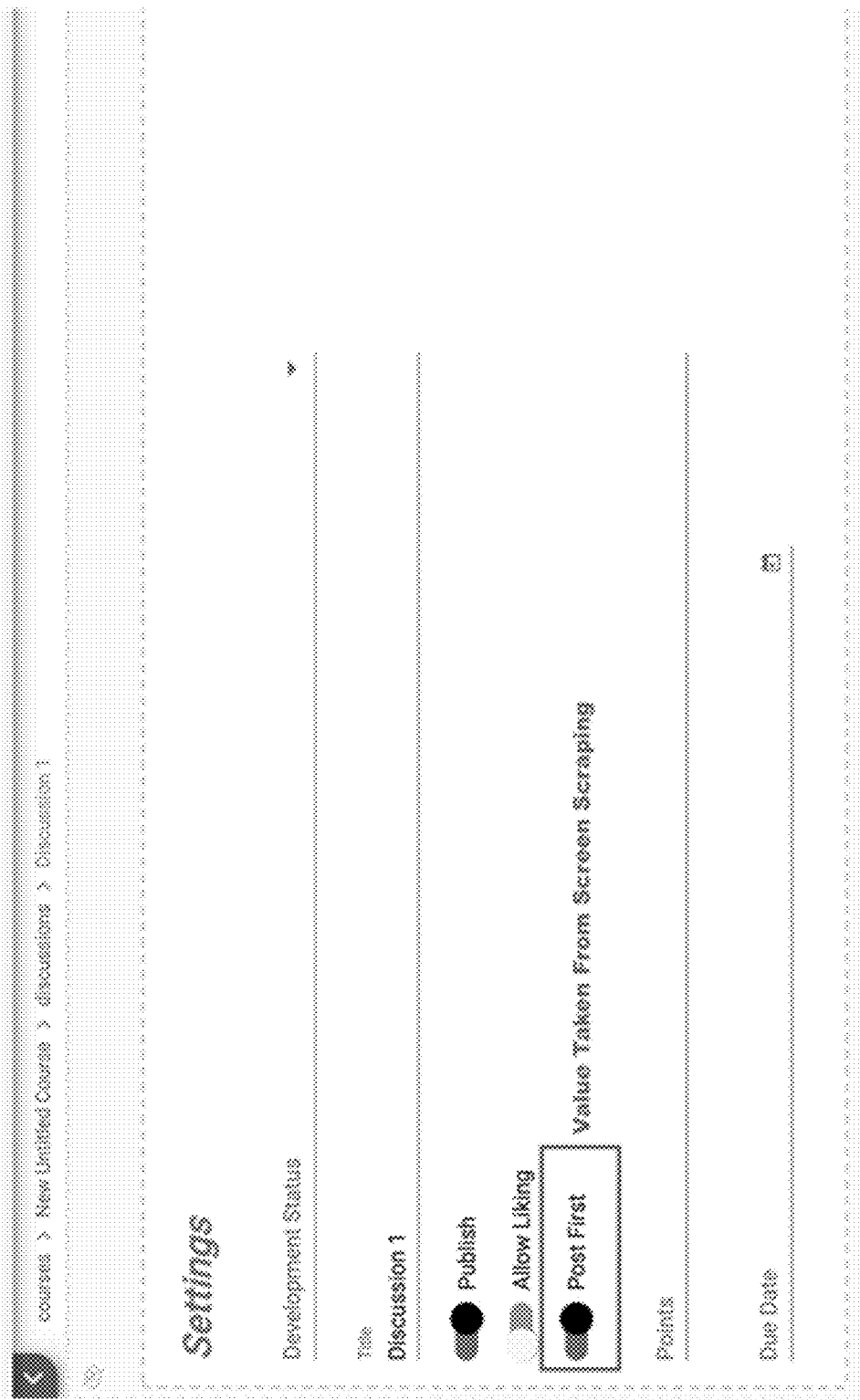
FIG. 6A depicts a screenshot illustrating an example of course data extracted from a source system via screen scrape being ingested and viewed in a user interface associated with a data controller, in accordance with some example embodiments.
Figure 6B:
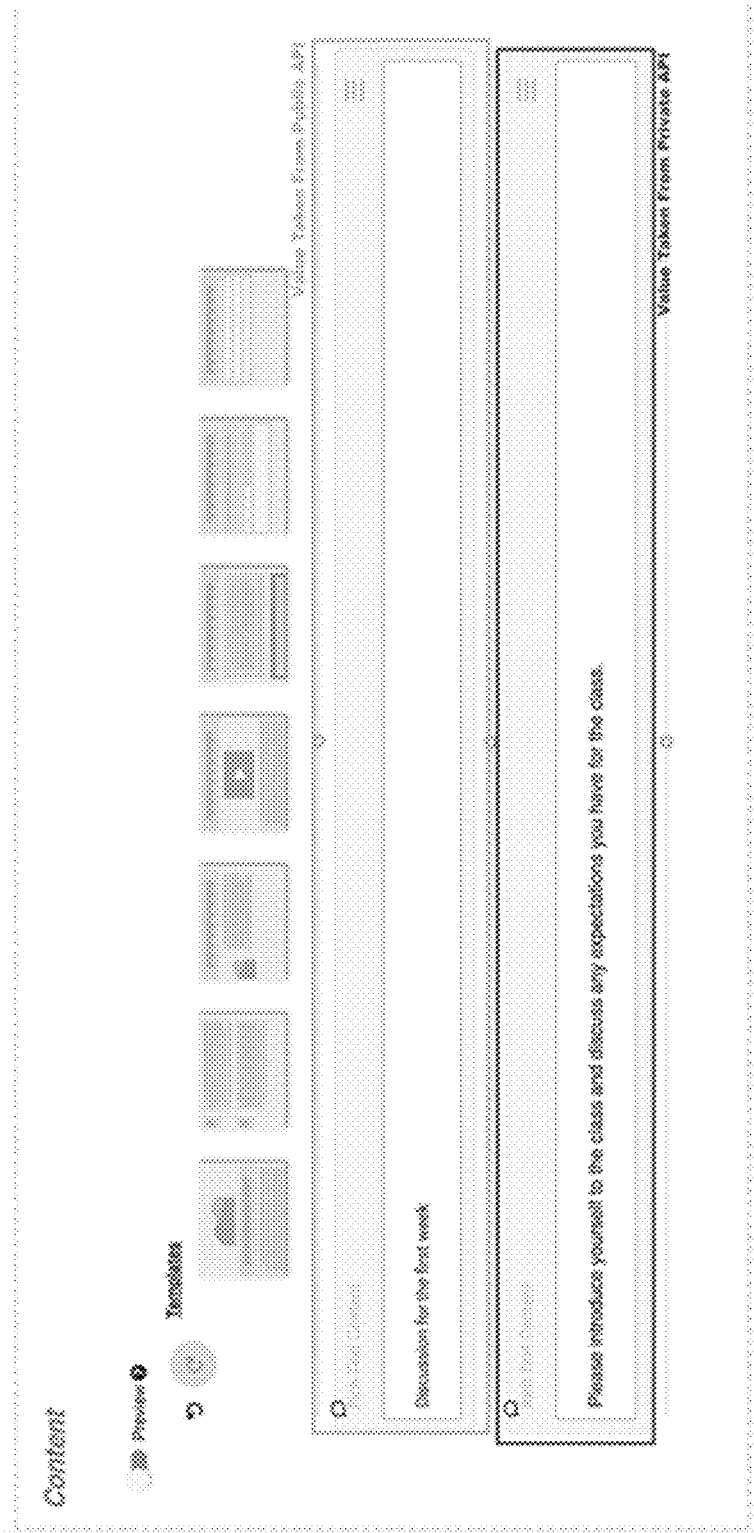
FIG. 6B depicts a screenshot illustrating another example of course data extracted from a source system via both the public and private application program interface (API) being ingested and viewed by a user interface associated with a data controller, in accordance with some example embodiments.
Figure 6C:
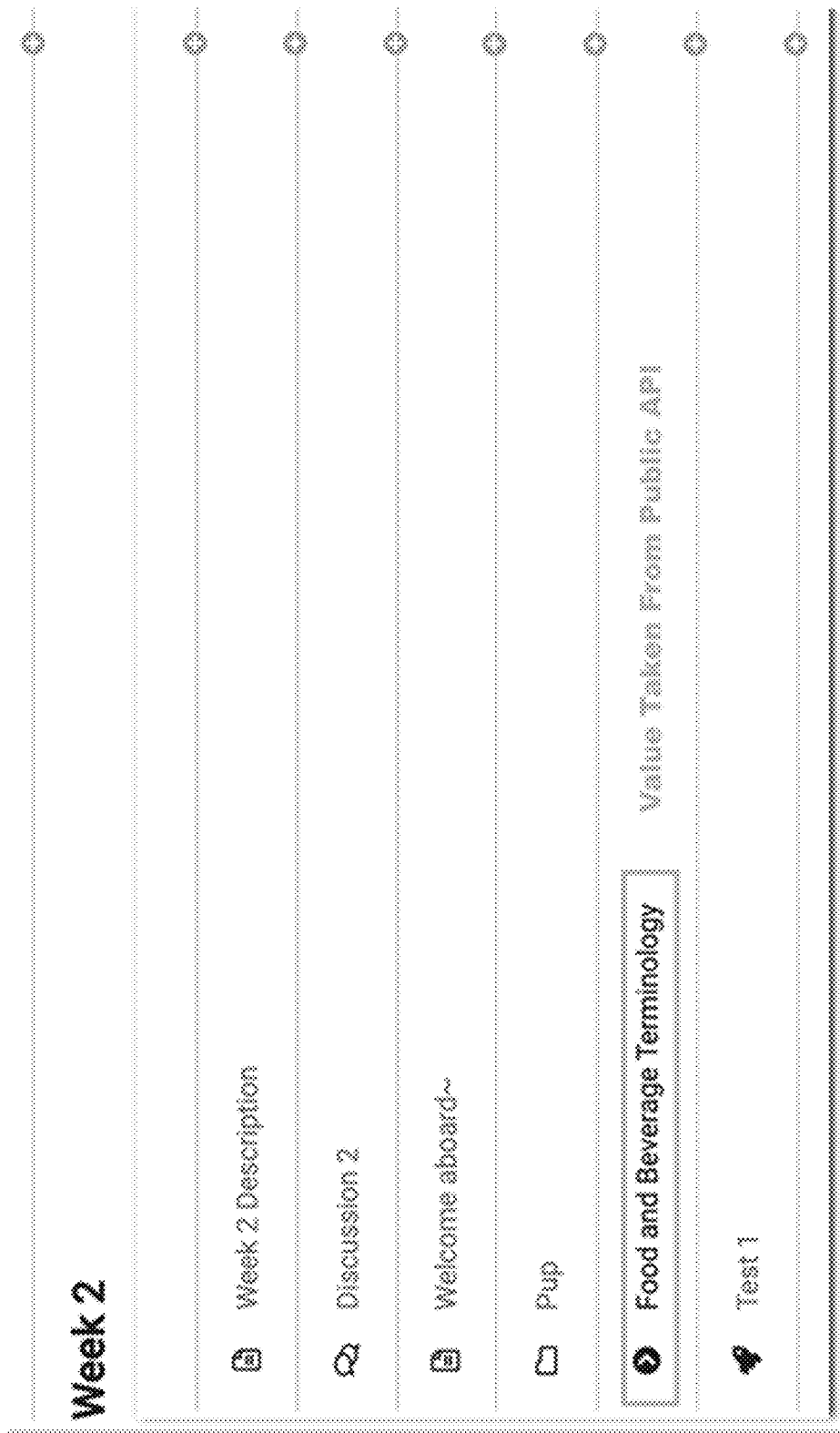
FIG. 6C depicts a screenshot illustrating another example of course data extracted from a source system via the public application programming interface (API) being ingested and viewed by a user interface associated with a data controller, in accordance with some example embodiments.
Figure 6D:
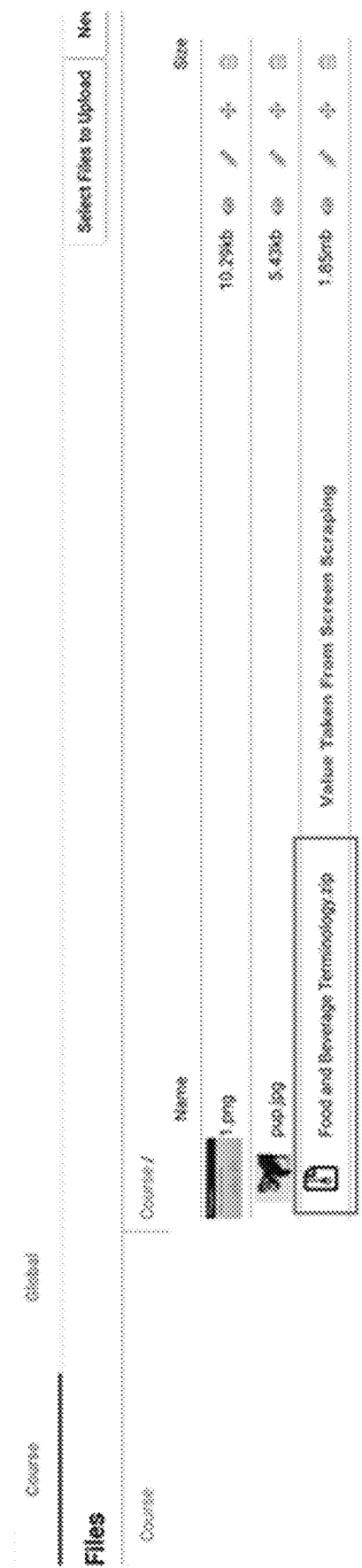
FIG. 6D depicts a screenshot illustrating another example of course data extracted from a source system via screen scraping being ingested and viewed by a user interface associated with the data controller, in accordance with some example embodiments.
Figure 6E:
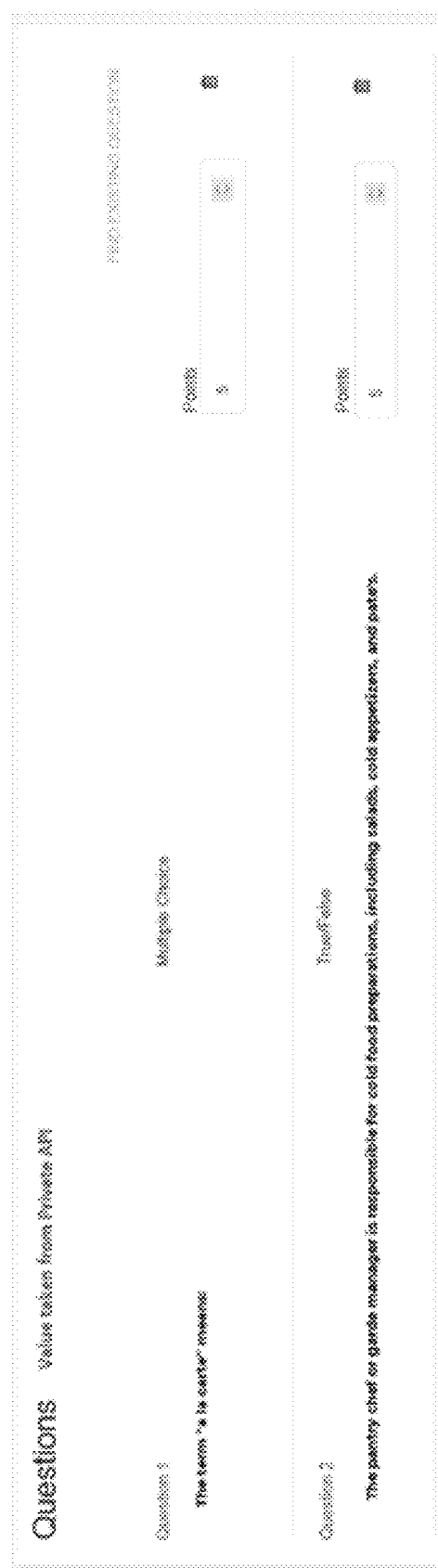
FIG. 6E depicts a screenshot illustrating another example of course data extracted from a source system via private application program interface (API) being ingested and viewed by a user interface associated with a data controller, in accordance with some example embodiments.
Figure 9A:
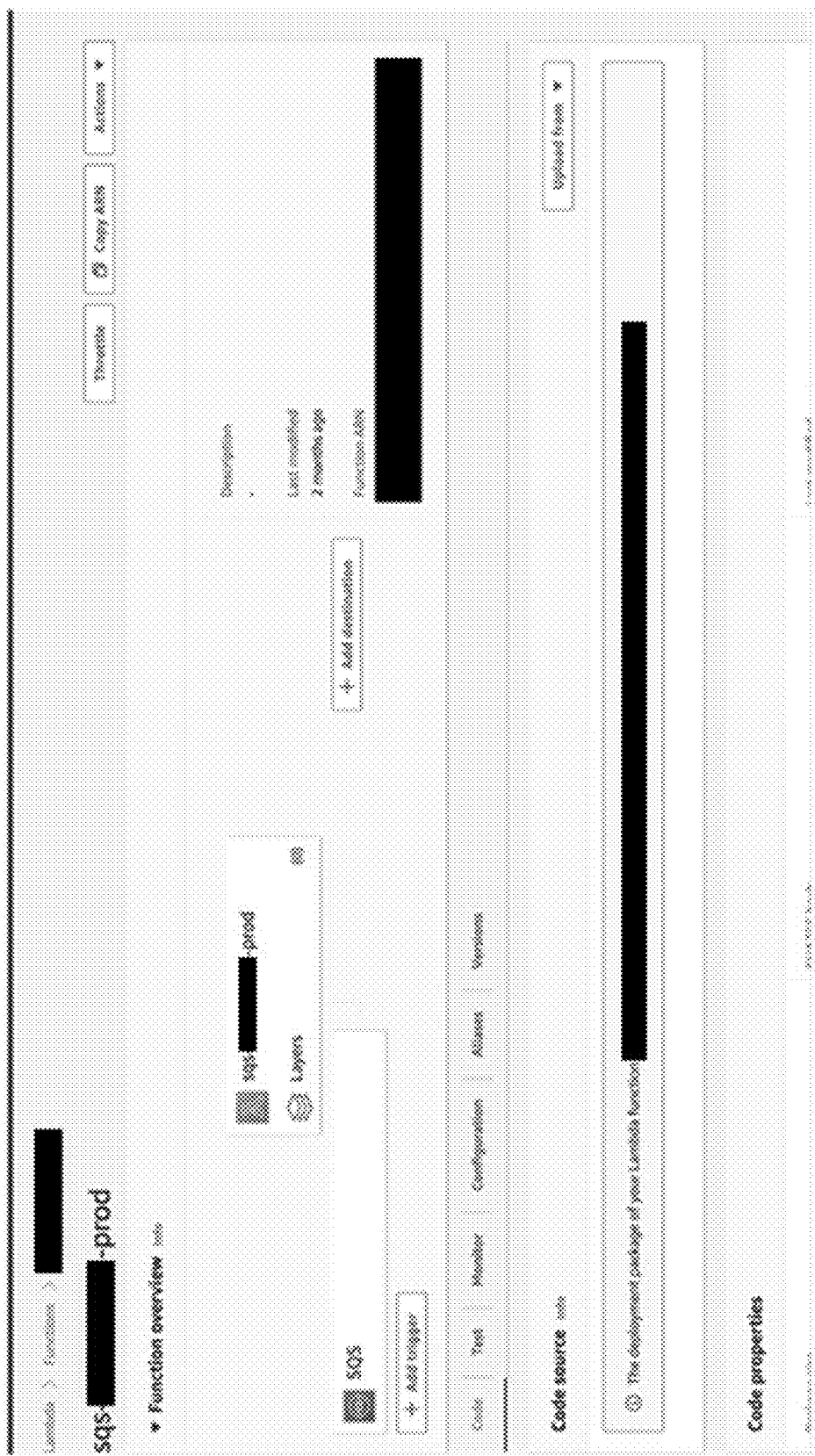
FIG. 9A depicts a screenshot illustrating an example of a user interface to initiate a microservice for migrating course data from a data controller to a target system, in accordance with some example embodiments.
Figure 9B:
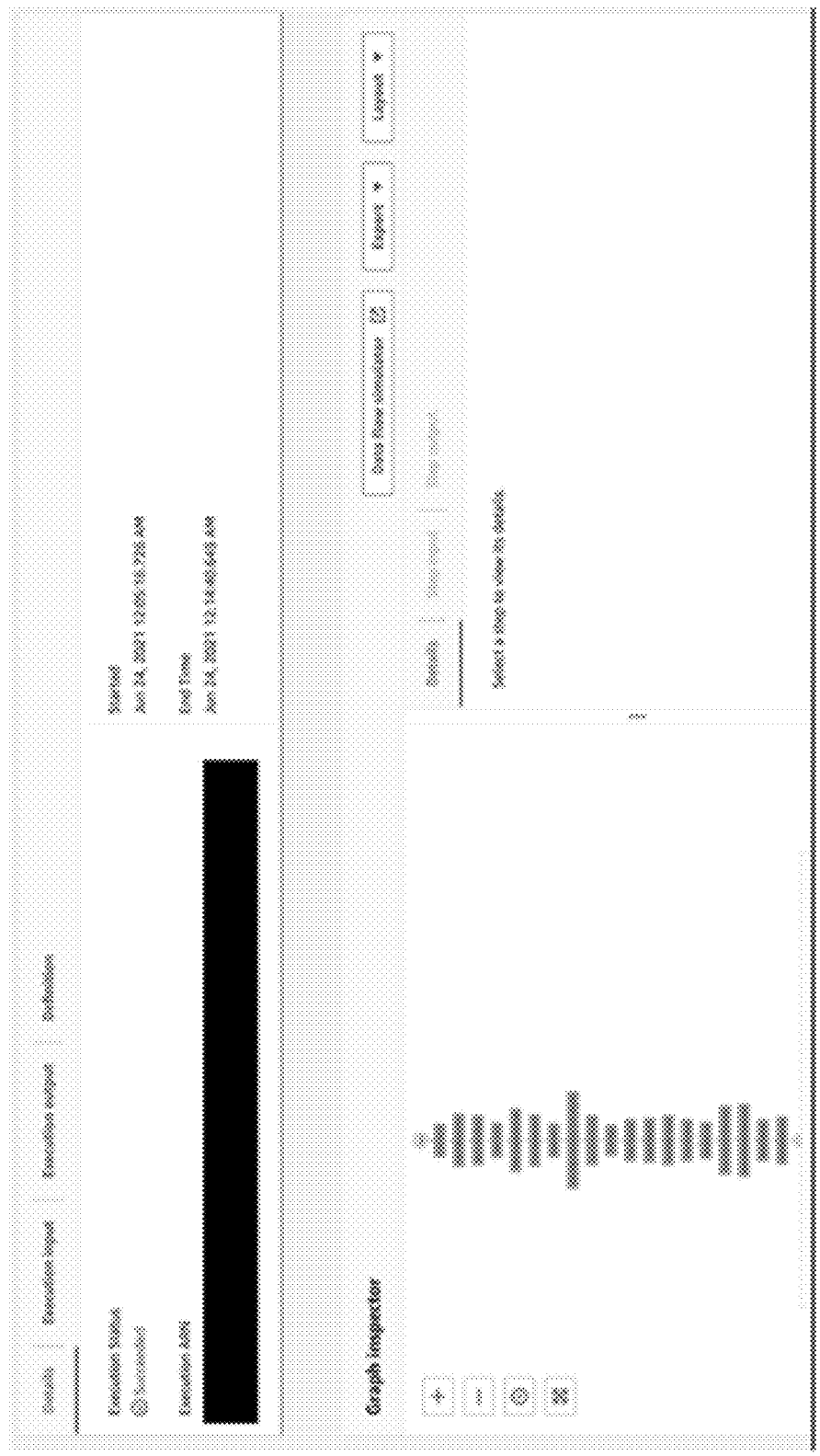
FIG. 9B depicts a screenshot illustrating an example of a user interface to initiate a microservice to migrate course data from the data controller to a target system, in accordance with some example embodiments.

FIG. 5A depicts a screenshot illustrating an example of a user interface to initiate the microservice for pulling the course data 122 from the source system 120 to the data controller 110. FIG. 5B depicts a screenshot illustrating example of a user interface showing the microservice executing the pulling of the course data 122 from the source system 120 into the data controller 110. As shown in FIGS. 5A-B, the course data 122 that is migrated to the data controller 110 may include the data associated with each course included in the source system 120 including, for example, the values of the user inputs and/or user settings populating the fields of each course component. Alternatively, and/or additionally, the data controller 110 may pull the course data 122 from the source system 120 and archive a portion of the course data 122 in the data store 115 before the data controller 110 pushes the course data 122 to the target system 130. In either case, it should be appreciated that the transfer of the course data 122 may be able to occur with minimal user intervention. Instead, the migration engine 112 may identify corresponding course components and transform course components from the source system 120 that do not map directly to a corresponding course component at the target system 130. FIGS. 6A-E depict screenshots illustrating examples of data extracted via a public application programming interface (API), a private application programming interface (API), and screen scraping after the data is ingested in the data controller 110. FIGS. 9A-B depict screenshots of user interfaces for initiating a microservice for migrating the course data 122 from the data controller 110 to the target system 130. The example of the user interface shown in FIG. 9B includes a status of the transfer to the target system 130.

Figure 7B:
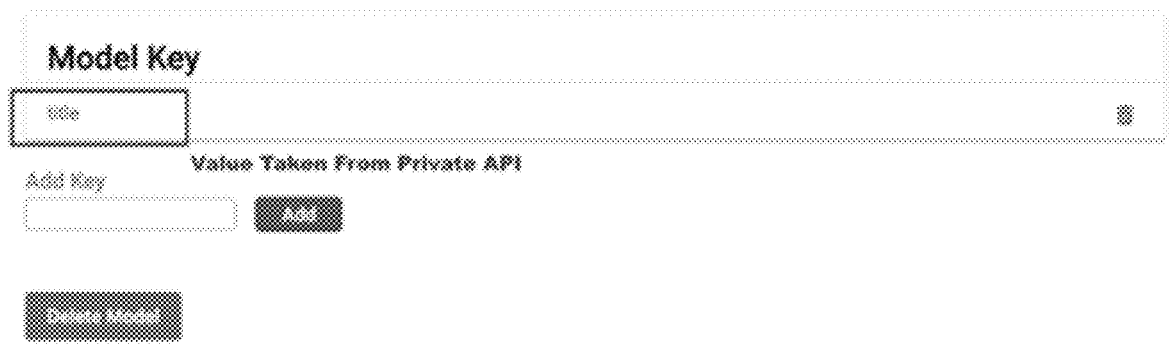
FIG. 7B depicts another example of a data model key from source data controller that shows course data components being ingested from a source system, in accordance with some example embodiments.
Figure 10A:
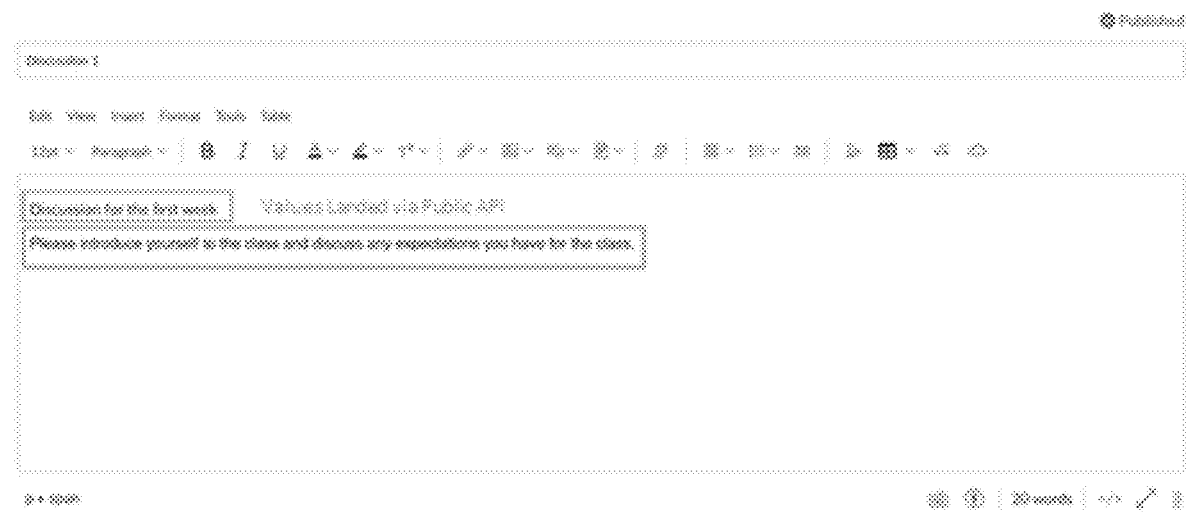
FIG. 10A depicts a screenshot illustrating an example of course data that has been migrated from a data controller to a target system via a public application programming interface (API), in accordance with some example embodiments.
Figure 10B:
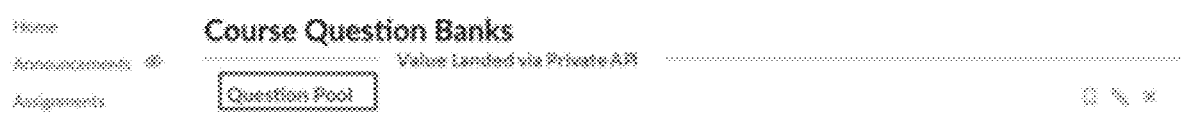
FIG. 10B depicts a screenshot illustrating another example of course data that has been migrated from a data controller to a target system via a private application programming interface (API), in accordance with some example embodiments.

FIGS. 6A-E depict screenshots illustrating examples of a user interface associated with the data controller 110 displaying the course data 122 being pulled from the source system 120. Meanwhile, FIGS. 10A-C depict various examples of the course data 122, which have been extracted from the source system 120 via a public application programming interface (API), a private application programming interface, and screen scraping, after landing in the target system 130. The course data 122 may reside at the source system 120, for example, in the data store 115, in a neutral data format that neither represents the data format from the source system 120 nor the data format from the target system 130. By having the course data 122 reside in a neutral data format within data store 115, the course data 122 is able to undergo a comprehensive validation process to ensure that all of the course data 122 has been pulled from the source system 120 during migration. As shown in FIGS. 7A-B, validation may be further achieved by organizing the course data elements pulled from the source system 120 within the data controller 110. For example, the data controller 110 may assign, to each component included in the course data 122 pulled from the source system 120, keys (or labels) associated with a neutral naming convention that is specific to neither the source system 120 nor the target system 130. That is, the data controller 110 may change the keys (or labels) that are specific to the source system 120 to neutral keys (or labels). In doing so, the data controller 110 may determine whether every component of the course data 122 have been pulled from the source system 120. Moreover, the assignment of a neutral key (or label) may enable the data controller 110 to perform a subsequent mapping to the keys (or labels) associated with the target system 130.

Figure 8A:
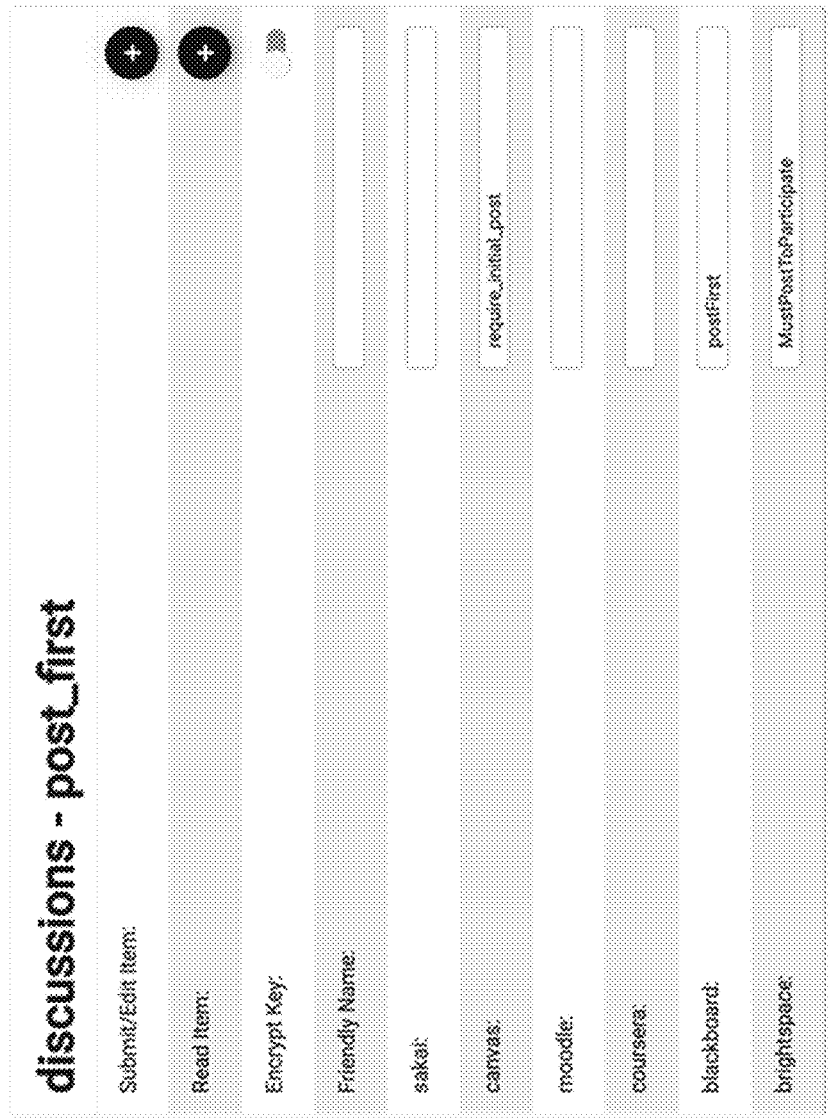
FIG. 8A depicts an example of a mapping between course data components across multiple learning management systems within a data controller, in accordance with some example embodiments.
Figure 8B:
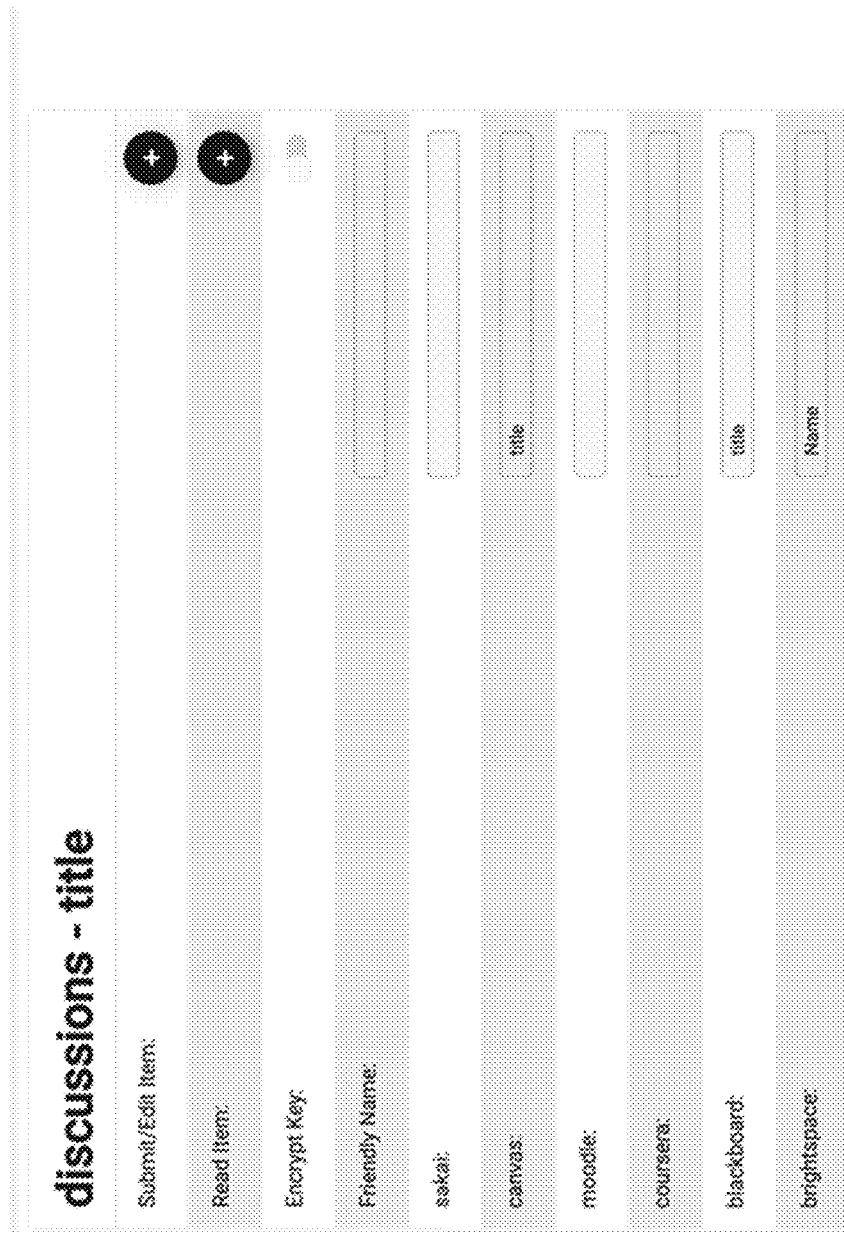
FIG. 8B depicts another example of a mapping between course data components across multiple learning management systems within a data controller, in accordance with some example embodiments.
Figure 8C:
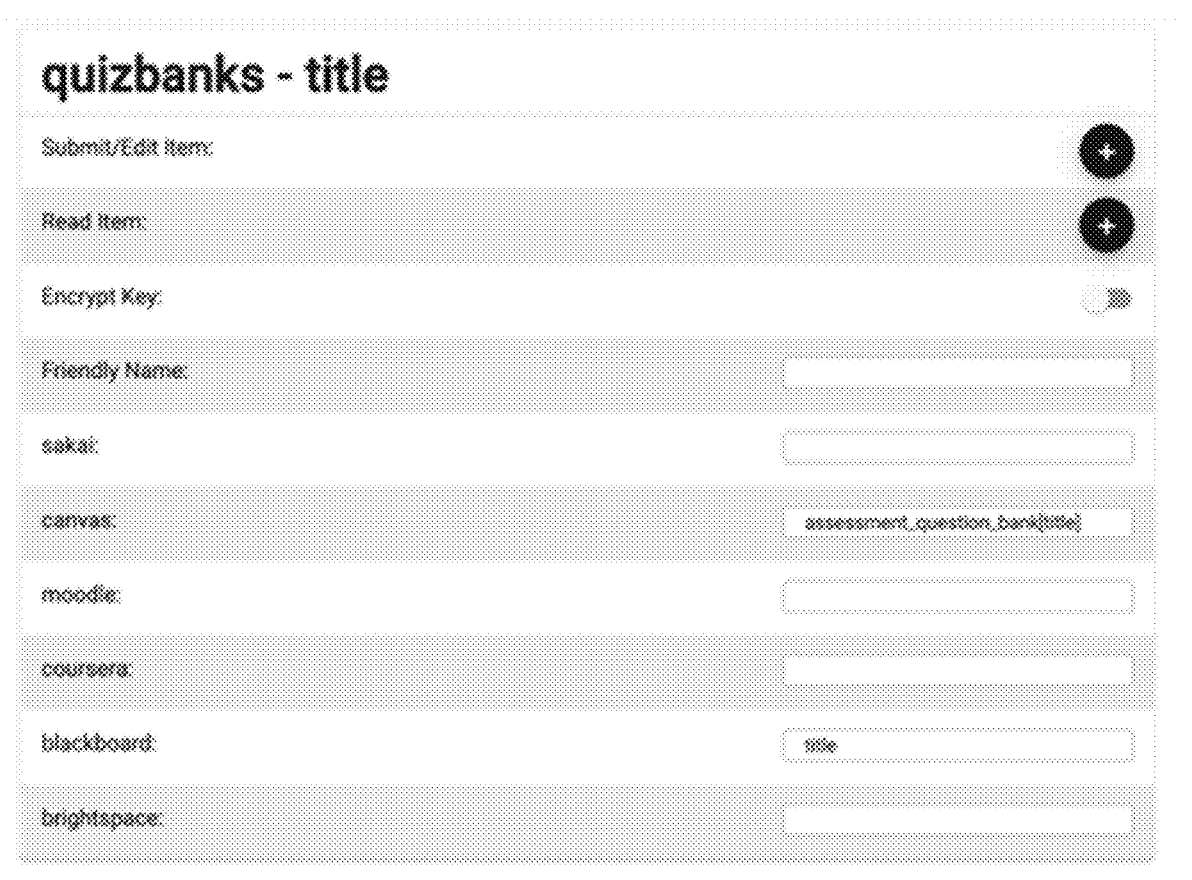

As noted, the migration engine 112 may identify corresponding course components and transform course components from the source system 120 that do not map directly to a corresponding course component at the target system 130. In some example embodiments, the migration engine 112 may maintain mappings between the fields forming each course component at different learning management systems including, for example, the source system 120 and the target system 130. FIGS. 8A-C depict examples of mappings between the same fields amongst different learning management systems, which the migration engine 112 may use to identify corresponding course components and transform a course component at the source system 120 to a course component that is consistent with that of the target system 130. For example, FIG. 8A depicts mappings for the field "discussions-first post" for a discussion thread in the forum of a course, FIG. 8B depicts mappings for the field "discussions-title", and FIG. 8C depicts mappings for the field "quizbanks-title." As shown in FIGS. 8A-C, the mappings for the fields of a course component may include the keys (or labels) that is assigned to each field at different learning management system. Accordingly, by applying the examples of the mappings shown in FIGS. 8A-BC, the migration engine 112 may be able to correctly identify portions of the course data 122 that correspond to the first post and the title of various discussion threads and quizbanks, and assign the correct keys (labels) for these fields at the target system 130.

That the course data 122 is represented using a lightweight data interchange format (e.g., JavaScript Object Notation (JSON) and/or the like) as a collection of key-value pairs may allow the migration engine 112 to support the configuration of individual course components through, for example, the addition, removal, and/or modification of one or more fields. Unlike a relational data model, a key-value pair representation of the course data 122 may be more flexible at least because one or more fields may be added to a course component without adding an entire column to a corresponding database table. Due to the configurable nature of the key-value pair representation, the transformation mappings between the fields of a course component and the keys (or labels) that is assigned to each field at different learning management system may be entered via the examples of user interfaces shown in FIGS. 8A-C. Otherwise, the mappings between same course components at the source system 120 and the target system 130 would be achieved through programming code. The latter solution is more costly, time consuming, and difficult to keep up-to-date. Contrastingly, with the configurability afforded by the key-value pair representation, changes in the fields of a course component including changes to the corresponding keys (or labels) may be implemented by editing a corresponding field in the user interfaces shown in FIGS. 8A-C.

Referring again to FIG. 1, in some example embodiments, the data controller 110 may include a listener 116 configured to operate at the web logic layer to monitor for changes to at least a portion of data associated with the source system 120. For example, the listener 116 may be configured to monitor for changes to one or more key data elements specified by a user. In the event the listener 116 detects a change at the source system 120 (e.g., a change to the one or more key data elements), the listener 116 may capture the changes, for example, by pulling the changes to the data controller 110, before publishing at least a portion of the changes to the target system 130. For instance, if the source system 120 is a legacy system (e.g., a legacy student information system (SIS)) and the target system 130 is a new system (e.g., a new student information system (SIS) or a different type of data management system altogether), the listener 116 may be configured to pull and push at least some data (e.g., user specified key data elements) between the source system 120 and the target system 130 in accordance with a user defined schedule.

In some instances, the polling for changes at the source system 120 may occur at a different frequency than the pushing of changes to the target system 130. Nevertheless, it should be appreciated that the listener 116 operates to ensure synchronicity between at least a portion of the data (e.g., the user specified key data elements) at the source system 120 and at the target system 130. For example, the listener 116 may push new or changed data from the source system 120 to the target system 130 at a sufficient rate to ensure that the target system 130 includes up-to-date, real time (or near real time) data from the source system 120 on an ongoing and continuous basis.

In some example embodiments, the listener 116 may be implemented as a cron command-line utility (or a "cron job") at the data controller 110. As such, the programming code implementing the listener 116, for example, one or more queries, may be scheduled to run in accordance to a user defined schedule to perform lookups of changes made to at least a portion of the data (e.g., the key data elements) at source system 120. For example, the listener 116 may be configured to operate near real time, by the minute, on the hour, per day, per week, and/or the like. In accordance with the user defined schedule, the cron job implementing the listener 116 may wake up to access the source system 120 and/or the target system 130 through, for example, the web logic layer. Moreover, the cron job implementing the listener 116 may be configured to operate in accordance with certain user defined criteria such as the key data elements that require synchronization between the source system 120 and the target system 130.

In some example embodiments, the listener 116 (e.g., the cron job) may detect for changes at the source system 120 through a variety of channels including, for example, a public application programming interface (API), a private application programming interface (API), and screen scraping. For example, the listener 116 (e.g., the cron job) may extract, from the source system 120, data such as the key data elements specified by the user through a first channel such as a public application programming; interface (API) and/or a private application programming interface (API) associated with the source system 120. If the listener 116 fails to extract one or more key data elements through the first channel, the listener 116 may use a second channel to extract these key data elements from the source system 120, The second channel may include screen scraping one or more webpages (e.g., displayed by a web browser) and/or graphical user interfaces (GUI) associated with the source system 120 to extract the one or more key data elements the listener 116 failed to extract through the first channel. The listener 116 may pull the key data elements into the data controller 110 in order to perform a delta check between the version of the data elements pulled from the source system 120 and the previous version of the same data elements stored at the data controller 110, for example, at the data store 115. Those data elements determined to exhibit changes may be marked as modified (e.g., new, updated, deleted, and/or the like).

As noted, the listener 116 may push, to the target system 130, data that has undergone change at the source system 120. For example, the listener 116 may be configured to push, to the target system 130, key data elements marked as modified (e.g., new, updated, deleted, and/or the like). It should be appreciated that the pushing of data to the target system 130 may be performed by the same cron job or a different cron job. Accordingly, the polling for changed data at the source system 120 and the pulling of changed data from the source system 120 may occur at a same time or at different times than the pushing of changed data to the target system 130. In some instances, the target system 130 may send, to the data controller 110, a validation once the changes pushed to the target system 130 are applied to the corresponding data elements. Upon receiving this validation, the data controller 110 may update the version of the data elements stored at the data controller 110, for example, at the data store 115, for the next iteration of delta checks. In some cases, instead of a delta check, changes at the source system 120 may be also be detected based on the timestamps of changes at the source system 120. For instance, the listener 116 may be configured to pull, from the source system 120, only those changes with a later timestamp than the previous data pull from the source system 120.

Referring again to FIG. 1, in some example embodiments, the data controller 110 may be configured to provide a cloud-based archive for the course data 122 and the corresponding historical student data 124. For example, in addition to course components such as assignments, quizzes, and tests, the course data 122 maintained at the source system 120 may include other course level data such as the grades associated with individual assignments, quizzes, and tests. As noted, in some cases, the migration engine 112 may store, in the data store 115, at least a portion of the course data 122. The migration engine 112 may do so in order to preserve access to the course data 122, for example, to comply with certain regulations, even when use of the source system 120 is terminated. By contrast, the historical student data 124 associated with the course data 122, such as each student's final grades, may be archived at the data store 115 instead of being migrated to the target system 130. Unlike the course data 122, which is not user-specific and timestamped automatically to reflect when the data is uploaded, the historical student data 124 is user-specific and time-specific. The historical student data 124 is therefore not transferred to the target system 130 and is instead archived by the migration engine 112 at the data store 115. The migration engine 112 may nevertheless integrate the historical student data 124 with the course data 122 that is migrated to the target system 130 in order to preserve continued access to the historical student data 124 directly from the user interface 145 of the data controller 110 or, if the need arises, to restore the course data 122 and/or historical student data 124 from data controller 110 to the target system 130.

In some example embodiments, the data controller 110 may include a design engine 114 configured to support the development of new course content and/or the updating of existing course content. For example, the design engine 114 may generate, for display at the client device 140, a user interface 145 for developing new course content and updating existing course content. The design engine 114 may provide, via the user interface 145, a selection of templates for creating a syllabus that includes modifiable areas and non-modifiable areas that vary based on the role of the user creating the syllabus at the client device 140. Moreover, the design engine 114 may support a drag-drop functionality for adding, to a selected template, content such as text, images, and videos. Upon completion, the course content may be published directly to the target system 130. In the event the same course content is associated with multiple learning management systems, the updates may be propagated automatically to each learning management system.

Figure 11:
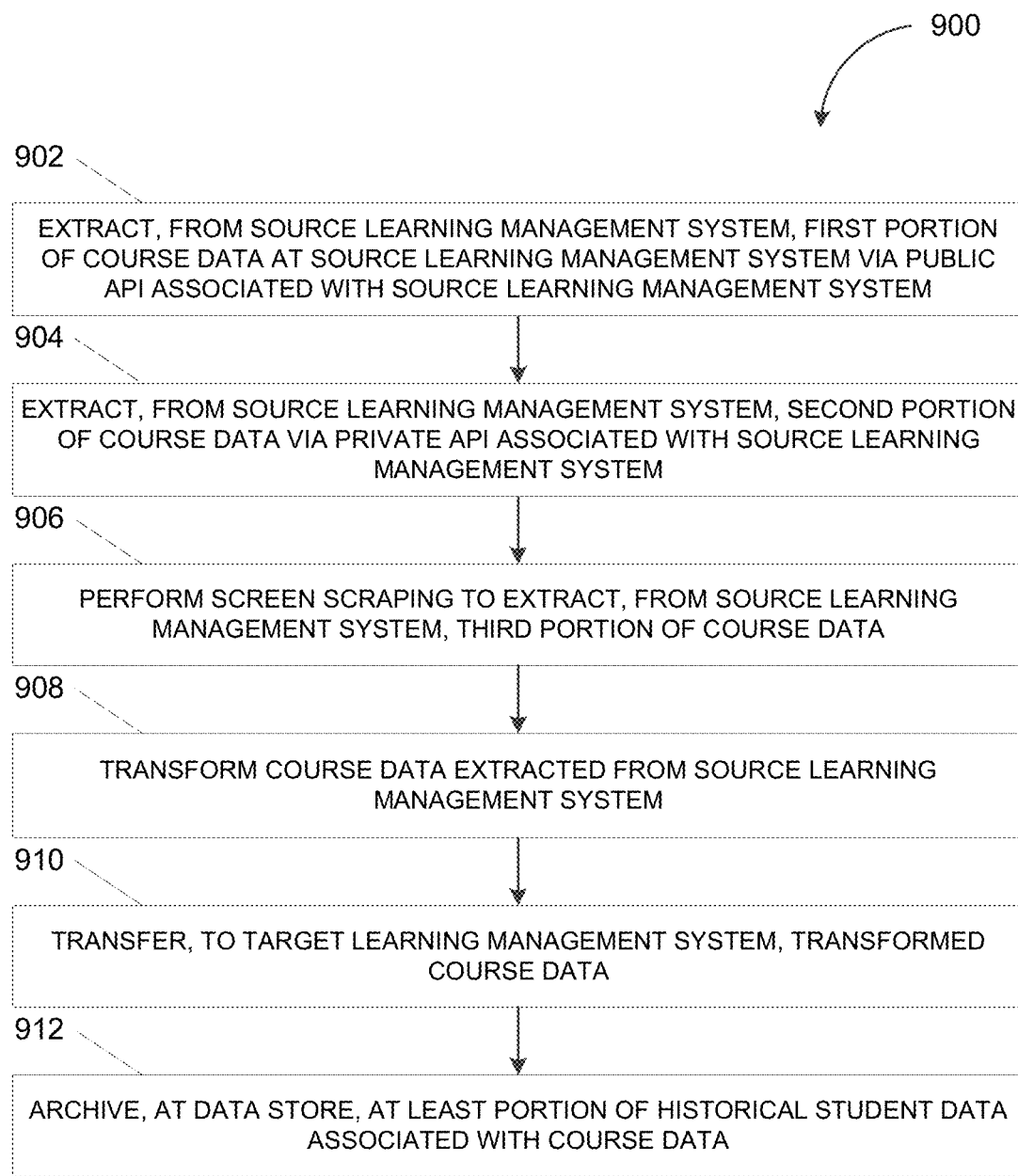
FIG. 11 depicts a flowchart illustrating an example of a process for migrating course content between a source system and a target system via a data controller, in accordance with some example embodiments.

FIG. 11 depicts a flowchart illustrating an example of a process 900 for migrating course content between a source system 120 and a target system 130, in accordance with some example embodiments. Referring to FIGS. 1 and 11, the process 900 may be performed by the data controller 110. For example, the migration engine 112 at the data controller 110 may perform the process 900 to migrate at least a portion of the course data 122 from the source system 120 to the target system 130.

At 902, the data controller 110 may extract, from a source system, a first portion of a course data at the source system via a public application programming interface (API) associated with the source system. In some example embodiments, the data controller 110 may extract the course data 122 from the source system 120 through a variety of channels including, for example, a public application programming interface (API), a private application programming interface (API), and screen scraping. For example, the data controller 110 may extract a first portion of the course data 122 through a first channel such as a public application programming interface (API) associated with the source system 120.

At 904, the data controller 110 may extract, from the source system, a second portion of the course data via a private application programming interface (API) associated with the source system. In some example embodiments, the data controller 110 may extract the course data 122 through additional channels to ensure that a second portion of the course data 122 that is inaccessible through the first channel (e.g., the public application programming interface (API)) is extracted through a second channel such as a private application programming interface (API) associated with the source system 120.

At 906, the data controller 110 may perform screen scraping to extract, from the source system, a third portion of the course data. In some cases, the course data 122 includes data that is inaccessible through an application programming interface including a public application programing interface and a private application programming interface. As such, the data controller 110 may use a third channel, such as screen scraping, to extract a third portion of the course data 122 that is inaccessible through the first channel and the second channel.

At 908, the data controller 110 may transform the course data extracted from the source system. As noted, although the same course components may be present at the source system 120 and the target system 130, differences in course structure can cause the mislabeling and/or loss of at least some of the course data 122 during migration. Accordingly, the data controller 110 may performing mappings and transformations to reconcile how the fields of the course data 122 are represented in the source system 120 with how the same fields are represented in the target system 130. Examples of structural differences may include a difference where the source system 120 and the target system 130 assign different keys (or labels) to the same field in a course component. Accordingly, in some example embodiments, the data controller 110 may maintain mappings between the fields forming each course component at different learning management systems including, for example, the source system 120 and the target system 130. The data controller 110 may use these mappings to identify corresponding fields that are assigned different keys at the source system 120 and the target system 130. For example, FIG. 8A depicts mappings for the field "discussions-first post" for a discussion thread in the forum of a course, FIG. 8B depicts mappings for the field "discussions-title", and FIG. 8C depicts mappings for the field "quizbanks-title." As shown in FIGS. 8A-C, the mappings for the fields of a course component may include the keys (or labels) that is assigned to each field at different learning management system. As part of the transformation, the data controller 110 may apply the mappings to identify portions of the course data 122 that correspond to the first post and the title of various discussion threads, as well as title of various quiz banks, and assign the correct keys (or labels) for these fields at the target system 130.

At 910, the data controller 110 may transfer, to the target system, the transformed course data. For example, the transformed course data 122 may be pushed to the target system 130. In some cases, the data controller 110 may provide a cloud-based archive for at least a portion of the course data 122. For example, the data controller 110 may store, in the data store 115, at least a portion of the course data 122 such that the course data 122 remains accessible even when the use of the source system 120 is terminated.

At 912, the data controller 110 may archive, at a data store associated with the data controller 110, at least a portion of the historical student data associated with the course data. In some example embodiments, the data controller 110 may archive at least a portion of the historical student data 124 associated with the course data 122. Unlike the course data 122, which is not user-specific and timestamped automatically to reflect when the data is uploaded, the historical student data 124 is user-specific and time-specific. As such, the historical student data 124 is not transferred to the target system 130 and is instead archived by the migration engine 112 at the data store 115 within the data controller 110. The migration engine 112 may nevertheless integrate the historical student data 124 with the course data 122 that is migrated to the target system 130 in order to preserve continued access to the historical student data 124 directly from the user interface 145 of the data controller 110 or, if the need arises, to restore the course data 122 and/or historical student data 124 from data controller 110 to the target system 130.

Figure 12:
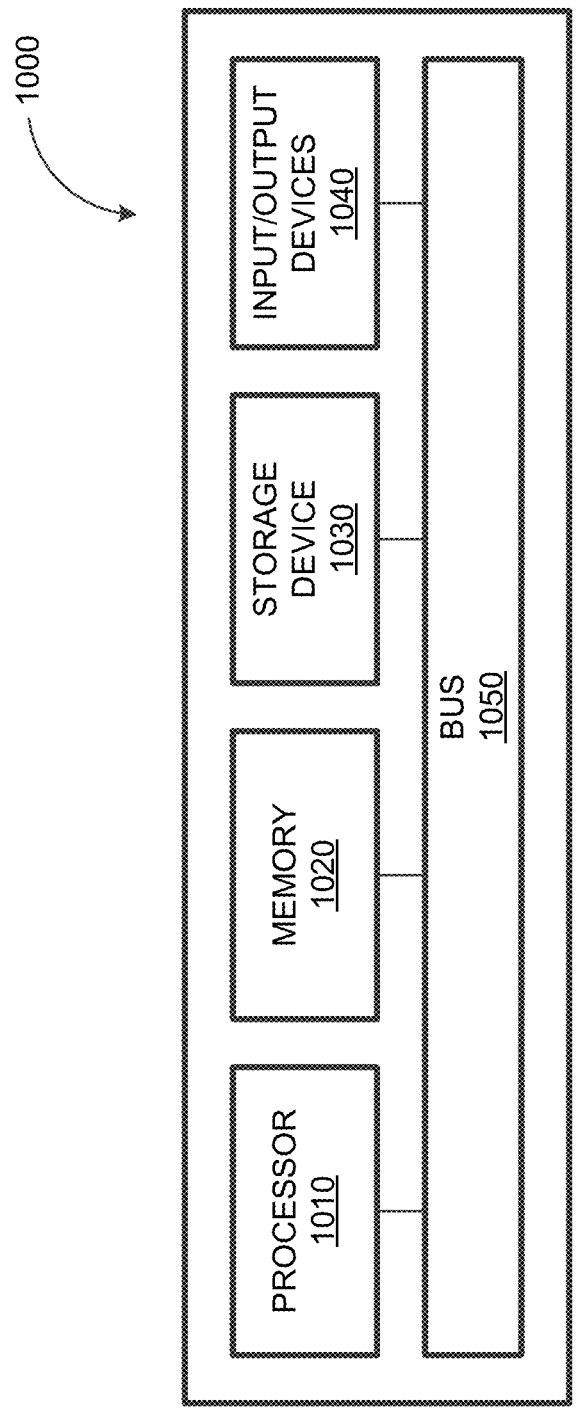
FIG. 12 depicts a block diagram illustrating an example of a computing system, in accordance with some example embodiments.

FIG. 12 depicts a block diagram illustrating a computing system 1000 consistent with implementations of the current subject matter. Referring to FIGS. 1 and 12, the computing system 1000 can be used to implement the data controller 110 and/or any components therein.

As shown in FIG. 12, the computing system 1000 can include a processor 1010, a memory 1020, a storage device 1030, and an input/output device 1040. The processor 1010, the memory 1020, the storage device 1030, and the input/output device 1040 can be interconnected via a system bus 1050. The processor 1010 is capable of processing instructions for execution within the computing system 1000. Such executed instructions can implement one or more components of, for example, the data controller 110 and/or the like. In some example embodiments, the processor 1010 can be a single-threaded processor. Alternately, the processor 1010 can be a multi-threaded processor. The processor 1010 is capable of processing instructions stored in the memory 1020 and/or on the storage device 1030 to display graphical information for a user interface provided via the input/output device 1040.

The memory 1020 is a computer readable medium such as volatile or non-volatile that stores information within the computing system 1000. The memory 1020 can store data structures representing configuration object databases, for example. The storage device 1030 is capable of providing persistent storage for the computing system 1000. The storage device 1030 can be a floppy disk device, a hard disk device, an optical disk device, a tape device, a solid state drive, and/or other suitable persistent storage means. The input/output device 1040 provides input/output operations for the computing system 1000. In some example embodiments, the input/output device 1040 includes a keyboard and/or pointing device. In various implementations, the input/output device 1040 includes a display unit for displaying graphical user interfaces.

According to some example embodiments, the input/output device 1040 can provide input/output operations for a network device. For example, the input/output device 1040 can include Ethernet ports or other networking ports to communicate with one or more wired and/or wireless networks (e.g., a local area network (LAN), a wide area network (WAN), the Internet).

In some example embodiments, the computing system 1000 can be used to execute various interactive computer software applications that can be used for organization, analysis and/or storage of data in various formats. Alternatively, the computing system 1000 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing items and/or functionalities. Upon activation within the applications, the functionalities can be used to generate the user interface provided via the input/output device 1040. The user interface can be generated and presented to a user by the computing system 1000 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program item, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
   at least one data processor; and
   at least one memory storing instructions which, when executed by the at least one data processor, result in operations comprising:
   extracting, from a source system with aid of a data controller, a first portion of a course data at the source system via a public application programming interface (API) associated with the source system;
   upon extracting the first portion of the course data, performing a first completeness check by a listener of the data controller to determine if any course components are missing from the first portion of the course data;
   in response to the first completeness check being unsuccessful, using a private application programming interface (API) that is exposed to users with permissions to extract, with the aid of the data controller, a second portion of the course data that is not exposed via the public application programming interface (API);
   upon extracting the second portion of the course data, performing a second completeness check by the listener of the data controller to determine if any course components are missing from the second portion of the course data;
   in response to the second completeness check being unsuccessful, with the aid of the data controller performing a screen scraping to extract, from the source system, a third portion of the course data that is inaccessible via the private application programming interface due to a lack of the permissions associated with the private application programming interface (API), the screen scraping includes performing image recognition or text recognition on the third portion of the course data displayed in a webpage facilitated by a design engine of the data controller or a graphic user interface associated with the source system;
   archiving, by the design engine, a subset of the first portion, the second portion, and/or the third portion of the course data to generate a cloud-based archive, wherein the subset is user-specific;
   transforming, by the data controller, a remainder of the first portion, the second portion or the third portion of the course data extracted from the source system, the transforming of the course data includes (i) mapping a course component from the source systems to a same course component from a target system that is associated with one or more different keys, (ii) adding, removing or modifying at least one field associated with the course component, and (iii) integrating the cloud-based archive to the course data, wherein the cloud-based archive is configured to provide access to the archived subset of data; and
   transferring, to the target system by a migration engine of the data controller, at least a portion of the transformed course data,
   wherein the extracting of the first portion, the second portion or the third portion of the course data is at least partially performed by the listener,
   wherein the listener is further configured to detect a change in one or more user specified data elements at the source system by at least performing a delta check between a data elements pulled from the source system and a previous version of the data element, and
   wherein the one or more user specified data elements are specified by a first user, and are transferred to the target system in response to the listener detecting a change between the data element pulled from the source system and the previous version of the data element.

2. The system of claim 1, wherein the course component is associated with at least one course, wherein the course component includes one or more fields corresponding to one or more key-value pairs, and wherein each key-value pair includes a value corresponding to one or more user inputs or user settings.

3. The system of claim 2, wherein the operations further comprise:
   maintaining, for each field of the course component, a mapping between a corresponding key at each of a plurality of systems including the source system and the target system.

4. The system of claim 2, wherein the transforming of the course data includes determining, based on a mapping between a first key associated with the source system and a second key associated with the target system, that a first field included in the course data corresponds to a second field at the target system, and populating, based at least on the correspondence between the first field and the second field, the second field with one or more values associated with the first field.

5. The system of claim 2, wherein the course component includes a syllabus, an assignment, a quiz, a discussion, a reading, a question, and a test.

6. The system of claim 1, wherein the operations further comprise:
   archiving, in a data store, at least a portion of the course data.

7. The system of claim 1, wherein the operations further comprise:
   archiving, at a data store, at least a portion of historical student data associated with the course data;
   integrating the archived historical student data with the course data in the data store such that the historical student data is accessible outside of the source system and the target system; and
   integrating the archived historical student data with the transformed course data transferred to the target system such that the archived historical student data is accessible through the target system.

8. The system of claim 1, wherein the transferring of the course data includes pushing the course data to the target system.

9. The system of claim 1, wherein the source system and the target system comprise a same or a different one of a learning management system (LMS), a student information system (SIS), a customer relationship management system (CRM), an enterprise resource planning (ERP) system, a financial aid management system, and a human resource management (HRM) system.

10. The system of claim 1, wherein the listener comprises a first cron job configured to execute in accordance with a first user specified schedule to pull data from the source system.

11. The system of claim 10, wherein the first cron job is further configured to push data to the target system in accordance with the first user specified schedule.

12. The system of claim 10, wherein the listener further comprises a second cron job configured to execute in accordance with a second user specified schedule to push data to the target system.

13. A computer-implemented method, comprising:
   extracting, from a source system with aid of a data controller, a first portion of a course data at the source system via a public application programming interface (API) associated with the source system;
   upon extracting the first portion of the course data, performing a first completeness check by a listener of the data controller to determine if any course components are missing from the first portion of the course data;
   in response to the first completeness check being unsuccessful, using a private application programming interface (API) that is exposed to users with permissions to extract, with eh aid of the data controller, a second portion of the course data that is not exposed via the public application programming interface (API);
   upon extracting the second portion of the course data, performing a second completeness check by the listener of the data controller to determine if any course components are missing from the second portion of the course data;
   in response to the second completeness check being unsuccessful, with the aid of the data controller, performing a screen scraping to extract, from the source system, a third portion of the course data that is inaccessible via the private application programming interface due to a lack of the permissions associated with the private application programming interface (API), the screen scraping includes performing image recognition dank or text recognition on the third portion of the course data displayed in a webpage facilitated by a design engine of the data controller or a graphic user interface associated with the source system;
   archiving, by the design engine of the data controller, a subset of the first portion, the second portion or the third portion of the course data to generate a cloud-based archive, wherein the subset is user-specific;
   transforming, by the data controller, a remainder of the first portion, the second portion or the third portion of the course data extracted from the source system, the transforming of the course data includes (i) mapping a course component from the source systems to a same course component from a target system that is associated with one or more different keys, (ii) adding, removing or modifying at least one field associated with the course component, and (iii) integrating the cloud-based archive to the course data, wherein the cloud-based archive is configured to provide access to the archived subset of data; and
   transferring, to the target system by a migration engine of the data controller, at least a portion of the transformed course data,
      wherein the extracting of the first portion, the second portion or the third portion of the course data is at least partially performed by the listener,
      wherein the listener is further configured to detect a change in one or more user specified data elements at the source system by at least performing a delta check between a data elements pulled from the source system and a previous version of the data element, and
      wherein the one or more user specified data elements are specified by a first user, and are transferred to the target system in response to the listener detecting a change between the data element pulled from the source system and the previous version of the data element.

14. A non-transitory computer readable medium storing instructions, which when executed by at least one data processor, result in operations comprising:
   extracting, from a source system, with aid of a data controller, a first portion of a course data at the source system via a public application programming interface (API) associated with the source system;
   upon extracting the first portion of the course data, performing a first completeness check by a listener of the data controller to determine if any course components are missing from the first portion of the course data;
   in response to the first completeness check being unsuccessful, using a private application programming interface (API) that is exposed to users with permissions to extract, with the aid of the data controller, a second portion of the course data that is not exposed via the public application programming interface (API);
   upon extracting the second portion of the course data, performing a second completeness check by the listener of the data controller to determine if any course components are missing from the second portion of the course data;

in response to the second completeness check being unsuccessful, with the aid of the data controller, performing a screen scraping to extract, from the source system, a third portion of the course data that is inaccessible via the private application programming interface due to a lack of the permissions associated with the private application programming interface (API), the screen scraping includes performing image recognition or text recognition on the third portion of the course data displayed in a webpage facilitated by a design engine of the data controller or a graphic user interface associated with the source system;

archiving, by the designed engine, a subset of the first portion, the second portion or the third portion of the course data to generate a cloud-based archive, wherein the subset is user-specific;

transforming, by the data controller, a remainder of the first portion, the second portion or the third portion of the course data extracted from the source system, the transforming of the course data includes (i) mapping a course component from the source systems to a same course component from a target system that is associated with one or more different keys, (ii) adding, removing or modifying at least one field associated with the course component, and (iii) integrating the cloud-based archive to the course data, wherein the cloud-based archive is configured to provide access to the archived subset of data; and transferring, to the target system by a migration engine of the data controller, at least a portion of the transformed course data, wherein the extracting of the first portion, the second portion or the third portion of the course data is at least partially performed by the listener, wherein the listener is further configured to detect a change in one or more user specified data elements at the source system by at least performing a delta check between a data elements pulled from the source system and a previous version of the data element, and wherein the one or more user specified data elements are specified by a first user, and are transferred to the target system in response to the listener detecting a change between the data element pulled from the source system and the previous version of the data element.

\* \* \* \* \*